(12) United States Patent
Aher et al.

(10) Patent No.: US 11,275,544 B2
(45) Date of Patent: Mar. 15, 2022

(54) METHOD AND SYSTEM FOR EFFICIENT JOB SCHEDULING BY COLLECTING DATA FROM MULTIPLE SOURCES

(71) Applicant: KONICA MINOLTA BUSINESS SOLUTIONS U.S.A., INC., Ramsey, NJ (US)

(72) Inventors: Pritam Aher, San Mateo, CA (US); Ryoichi Yokoohji, Mountain View, CA (US)

(73) Assignee: Konica Minolta Business Solutions, U.S.A., Inc., Ramsey, NJ (US)

( * ) Notice: Subject to any disclaimer, the term of this patent is extended or adjusted under 35 U.S.C. 154(b) by 0 days.

(21) Appl. No.: 16/834,174

(22) Filed: Mar. 30, 2020

(65) Prior Publication Data

US 2020/0310724 A1 Oct. 1, 2020

Related U.S. Application Data

(63) Continuation-in-part of application No. 16/364,978, filed on Mar. 26, 2019, now Pat. No. 10,761,796.

(51) Int. Cl.
*G06F 3/12* (2006.01)
*G06N 20/00* (2019.01)
*G06N 5/04* (2006.01)

(52) U.S. Cl.
CPC .......... *G06F 3/1261* (2013.01); *G06F 3/1204* (2013.01); *G06F 3/1226* (2013.01); *G06F 3/1289* (2013.01); *G06N 5/04* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 2007/0229896 | A1* | 10/2007 | Fujimori | G06F 3/1288 358/1.16 |
| 2012/0320406 | A1* | 12/2012 | Giannetti | G06F 3/1275 358/1.15 |
| 2013/0163037 | A1* | 6/2013 | Uster | G06F 3/1205 358/1.15 |

(Continued)

FOREIGN PATENT DOCUMENTS

| | | |
|---|---|---|
| EP | 3355251 A1 ‡ | 8/2018 |
| EP | 3355251 A1 | 8/2018 |

*Primary Examiner* — Andrew H Lam
(74) *Attorney, Agent, or Firm* — Buchanan Ingersoll & Rooney PC

(57) ABSTRACT

A method, a non-transitory computer readable medium, and a system are disclosed for scheduling print jobs on a plurality of printers. The method includes: collecting job information on each of a plurality of print jobs; obtaining a predicted success rate for each of the plurality of print jobs with each of the plurality of printers based on the job information on the each of the plurality of print jobs, the predicted success rate being a likelihood that a print job can be successfully completed by a printer; and assigning each of the plurality of print jobs to one or more printers of the plurality of printers with the predicted success rate for each of the one or more printers of the plurality of print jobs being greater than a predicted success threshold.

21 Claims, 36 Drawing Sheets

(56) References Cited

U.S. PATENT DOCUMENTS

2013/0294794 A1* 11/2013 Yoshioka ........... G03G 15/5083
399/82
2014/0118775 A1‡ 5/2014 Motamed ............. G06Q 10/063
358/1

* cited by examiner
‡ imported from a related application

1000

| Job Name | Product Type | Priority | Color | Page Count | Copies | Finishing | Cluster | Job Received Time |
|---|---|---|---|---|---|---|---|---|
| Job1 | Brochure | Normal | Color | 200 | 30 | Stitching | No | 4:00 |
| Job2 | Book | Normal | B&W | 300 | 40 | None | No | 4:00 |
| Job3 | Manual | Normal | Color | 150 | 20 | Punching | No | 4:00 |
| Job4 | Book | Normal | B&W | 50 | 200 | Stitching | No | 4:30 |
| Job5 | DM | Normal | B&W | 100 | 10 | Folding | No | 4:30 |
| Job6 | Biz card | Normal | B&W | 100 | 50 | None | No | 4:30 |
| Job7 | Statement | Normal | Color | 300 | 30 | Folding | Yes | 5:00 |
| Job8 | Book | Normal | Color | 200 | 80 | None | No | 5:00 |
| Job9 | Book | Normal | B&W | 400 | 100 | None | No | 5:30 |
| Job10 | Book | Normal | Color | 150 | 100 | None | No | 5:30 |
| Job11 | Collateral | Normal | B&W | 200 | 50 | Stitching | No | 6:00 |
| Job12 | Biz card | Normal | Color | 100 | 50 | None | No | 6:00 |
| Job13 | Book | Normal | B&W | 100 | 30 | Folding | No | 6:30 |
| Job14 | Collateral | Normal | B&W | 50 | 100 | Stitching | No | 6:30 |
| Job15 | DM | Normal | Color | 200 | 10 | Folding | No | 6:30 |
| Job16 | Manual | Normal | Color | 50 | 200 | None | Yes | 7:00 |
| Job17 | Book | Normal | Color | 100 | 50 | Punching | No | 7:00 |

| Printer | Type | Options | 6AM | 7AM | 8AM | 9AM | 10AM | 11AM |
|---|---|---|---|---|---|---|---|---|
| Printer 1 | Black & White | Stitching, Punching | | | | | | |
| Printer 2 | Black & White | None | | | | | | |
| Printer 3 | Black & White | Folding | | | | | | |
| Printer 4 | Color | Stitching, Punching | | | | | | |
| Printer 5 | Color | Stitching, Punching, Folding | | | | | | |
| Printer 6 | Color | Stitching | | | | | | |

1700

| Job Name | Product Type | Priority | Color | Page Count | Copies | Finishing | Cluster | Job Received Time |
|---|---|---|---|---|---|---|---|---|
| Job1 | Brochure | Normal | Color | 200 | 30 | Stitching | No | 4:00 |
| Job2 | Book | Normal | B&W | 300 | 40 | None | No | 4:00 |
| Job3 | Manual | Normal | Color | 150 | 20 | Punching | No | 4:00 |
| Job4 | Book | Normal | B&W | 50 | 200 | Stitching | No | 4:30 |
| Job5 | DM | Normal | B&W | 100 | 10 | Folding | No | 4:30 |
| Job6 | Biz card | Normal | B&W | 100 | 50 | None | No | 4:30 |
| Job7 | Statement | Normal | Color | 300 | 30 | Folding | Yes | 5:00 |
| Job8 | Book | Normal | Color | 200 | 80 | None | No | 5:00 |
| Job9 | Book | Normal | B&W | 400 | 100 | None | No | 5:30 |
| Job10 | Book | Normal | Color | 150 | 100 | None | No | 5:30 |
| Job11 | Collateral | Normal | B&W | 200 | 50 | Stitching | No | 6:00 |
| Job12 | Biz card | Normal | Color | 100 | 50 | None | No | 6:00 |
| Job13 | Book | Normal | B&W | 100 | 30 | Folding | No | 6:30 |
| Job14 | Collateral | Normal | B&W | 50 | 100 | Stitching | No | 6:30 |
| Job15 | DM | Normal | Color | 200 | 10 | Folding | No | 6:30 |
| Job16 | Manual | Normal | Color | 50 | 200 | None | Yes | 7:00 |
| Job17 | Book | Normal | Color | 100 | 50 | Punching | No | 7:00 |
| Job18 | Brochure | Urgent | Color | 30 | 100 | Folding | No | 7:30 |

FIG. 17

| Printer | Type | Options | 6AM 7AM 8AM 9AM 10AM 11AM |
|---|---|---|---|
| Printer 1 | Black & White | Stitching, Punching | |
| Printer 2 | Black & White | None | |
| Printer 3 | Black & White | Folding | |
| Printer 4 | Color | Stitching, Punching | |
| Printer 5 | Color | Stitching, Punching, Folding | |
| Printer 6 | Color | Stitching | |

2900

| Jobs | Type | Pages Count | Page Size | Dead Line |
|---|---|---|---|---|
| Job 5 | Color | 100 | A4 | 11 AM |
| Job 11 | Color | 120 | 8 x 9 | 10 AM |
| ... | | | | |

3000

| Jobs | Type | Deadline | Prediction |
|---|---|---|---|
| Job 5 | Color | 11 | Printer A – 99.8 % Success rate<br>Printer B – 96.3 % Success Rate |
| Job 11 | Color | 10 | Printer A – 99.1 % Success rate<br>Printer B – 96.2 % Success Rate |
| ... | | | |

| Jobs | Type | Pages Count | Page Size | Dead Line |
|---|---|---|---|---|
| Job 5 | Color | 100 | A4 | 11 AM |
| Job 11 | Color | 120 | 8 x 9 | 10 AM |
| Job 12 | Color | 70 | A4 | 12 AM |
| Job 13 | Color | 400 | 10 x 11 | 11 AM |

FIG. 33

| Jobs | Type | Deadline | Prediction |
|---|---|---|---|
| Job 5 | Color | 11 AM | Printer A – 99.2 % Success rate<br>Printer B – 96.8 % Success Rate |
| Job 11 | Color | 10 AM | Printer A – 99.5 % Success rate<br>Printer B – 96.7 % Success Rate |
| Job 12 | Color | 12 AM | Printer B – 99.3 % Success rate<br>Printer A – 98.5 % Success Rate |
| Job 13 | Color | 11 AM | Printer A – 98.9 % Success rate<br>Printer B – 98.5 % Success Rate |

FIG. 34

| Jobs | Type | Deadline | Prediction |
|---|---|---|---|
| Job 8 | B & W | 11 | Printer D – 99.9 % Success Rate<br>Printer A – 99.7 % Success rate<br>Printer B – 99.4 % Success Rate<br>Printer C – 99.1 % Success Rate<br>Printer E – 96.7 % Success Rate<br>Printer F – 96.4 % Success Rate |
| Job 9 | Color | 12 | Printer D – 99.8 % Success Rate<br>Printer E – 96.6 % Success Rate<br>Printer F – 96.6 % Success Rate |
| Job 10 | B & W | 11 | Printer B – 99.1 % Success Rate<br>Printer A – 99.0 % Success rate<br>Printer C – 96.6 % Success Rate<br>Printer D – 96.5 % Success Rate<br>Printer E – 96.5 % Success Rate<br>Printer F – 95.8 % Success Rate |
| Job 11 | Color | 10 | Printer F – 99.9 % Success Rate<br>Printer D – 96.3 % Success Rate<br>Printer E – 96.1 % Success Rate |
| Job 12 | Color | 12 | Printer D – 99.7 % Success Rate<br>Printer E – 98.9 % Success Rate<br>Printer F – 98.0 % Success Rate |
| Job 13 | Color | 12 | Printer E – 98.9 % Success Rate<br>Printer D – 96.3 % Success Rate<br>Printer F – 96.0 % Success Rate |
| Job 14 | B & W | 09 | Printer D – 99.7 % Success Rate<br>Printer A – 99.5 % Success rate<br>Printer B – 96.6 % Success Rate<br>Printer C – 96.7 % Success Rate<br>Printer E – 96.5 % Success Rate<br>Printer F – 96.3 % Success Rate |

METHOD AND SYSTEM FOR EFFICIENT JOB SCHEDULING BY COLLECTING DATA FROM MULTIPLE SOURCES

CROSS REFERENCE TO RELATED APPLICATIONS

This application is a continuation-in-part of U.S. patent application Ser. No. 16/364,978, filed Mar. 26, 2019, which is incorporated by reference in its entirety.

FIELD OF THE INVENTION

The present disclosure relates to a method and system for efficient job scheduling by collecting data from multiple sources, and for visualizing a plurality of jobs on user interface, for example, a job schedule screen for use in a print shop.

BACKGROUND OF THE INVENTION

Current production printing workflow consists of many applications for each step. Those applications are typically developed by different vendors and having different databases. Therefore, a customer is required to check job status in each application, which makes it difficult for the customer to track the status of each of the print jobs from start to finish (i.e., end to end).

Since operators of each step of the print process cannot recognize activity of a previous step and/or a next step in the printing process, there is no chance to efficiently allocate print jobs to appropriate printers. For example, some jobs may require longer wait times even if other printers, which are capable of processing those jobs, are available and idling. In addition, it may be difficult for customer to decide whether a print shop can accept a high priority, for example, urgent jobs without affecting other regular jobs.

SUMMARY OF THE INVENTION

In consideration of the above issues, it would be desirable to have a method and system for efficient job scheduling by collecting data from multiple sources, which includes estimating job processing time in each step and scheduling jobs to minimize idle or down time of printers or machines, for example, post-processing machines, maximize productivity, and accumulating past experience to improve accuracy of subsequent jobs.

In addition, it would be desirable to determine suitable printers for an incoming print job or a plurality of incoming print jobs incorporating success rates for each of plural printers based on the job type and scheduling the incoming print jobs based on printer availability and rescheduled previously scheduled print job when need, for example, to meet job deadlines.

In accordance with an aspect, a method is disclosed for scheduling print jobs on a plurality of printers, the method comprising: collecting job information on each of a plurality of print jobs; assigning each of the plurality of print jobs to one or more printers of the plurality of printers; receiving a new print job, the new job including job product information; calculating a pre-processing time for the new print job; calculating a processing time for the new print job; determining at least one printer of the plurality of printers to execute the new print job; assigning the new print job to the at least one printer of the plurality of printers; determining if one or more of the plurality of print jobs assigned to the one or more of the plurality of printers can be reassigned to another printer of the plurality of printers to minimize a print schedule for each of the plurality of print jobs; and re-assigning the one or more of the plurality of print jobs to another printer of the plurality of printers when the reassigning of the one or more of the plurality of print jobs minimizes the print schedule of the plurality of print jobs.

In accordance with a further aspect, a non-transitory computer readable medium (CRM) storing computer program code executed by a computer processor is disclosed that performs a process for scheduling print jobs on a plurality of printers, the process comprising: collecting job information on each of a plurality of print jobs; assigning each of the plurality of print jobs to one or more printers of the plurality of printers; receiving a new print job, the new job including job product information; calculating a pre-processing time for the new print job; calculating a processing time for the new print job; determining at least one printer of the plurality of printers to execute the new print job; assigning the new print job to the at least one printer of the plurality of printers; determining if one or more of the plurality of print jobs assigned to the one or more of the plurality of printers can be reassigned to another printer of the plurality of printers to minimize a print schedule for each of the plurality of print jobs; and re-assigning the one or more of the plurality of print jobs to another printer of the plurality of printers when the reassigning of the one or more of the plurality of print jobs minimizes the print schedule of the plurality of print jobs.

In accordance with another aspect, a system is disclosed for printing a job ticket received from a client computer, the system comprising: one or more client devices configured to generate print jobs; a plurality of printers configured to print the print jobs; a server having a memory and a processor, the processor configured to: collect job information on each of a plurality of print jobs; assign each of the plurality of print jobs to one or more printers of the plurality of printers; receive a new print job, the new job including job product information; calculate a pre-processing time for the new print job; calculate a processing time for the new print job; determine at least one printer of the plurality of printers to execute the new print job; assign the new print job to the at least one printer of the plurality of printers; determine if one or more of the plurality of print jobs assigned to the one or more of the plurality of printers can be reassigned to another printer of the plurality of printers to minimize a print schedule for each of the plurality of print jobs; and re-assign the one or more of the plurality of print jobs to another printer of the plurality of printers when the reassigning of the one or more of the plurality of print jobs minimizes the print schedule of the plurality of print jobs.

In accordance with an aspect, a method is disclosed for scheduling print jobs on a plurality of printers, the method comprising: collecting job information on each of a plurality of print jobs; obtaining a predicted success rate for each of the plurality of print jobs with each of the plurality of printers based on the job information on the each of the plurality of print jobs, the predicted success rate being a likelihood that a print job can be successfully completed by a printer; and assigning each of the plurality of print jobs to one or more printers of the plurality of printers with the predicted success rate for each of the one or more printers of the plurality of print jobs being greater than a predicted success threshold.

In accordance with a further aspect, a non-transitory computer readable medium (CRM) storing computer program code executed by a computer processor that performs a process for scheduling print jobs on a plurality of printers is disclosed, the process comprising: collecting job information on each of a plurality of print jobs; obtaining a predicted success rate for each of the plurality of print jobs with each of the plurality of printers based on the job information on the each of the plurality of print jobs, the predicted success rate being a likelihood that a print job can be successfully completed by a printer, the obtained predicted success rate comprising inputting the job information on the each of the plurality of print jobs into a machine learning service; and assigning each of the plurality of print jobs to one or more printers of the plurality of printers with the predicted success rate for each of the one or more printers of the plurality of print jobs being greater than a predicted success threshold.

In accordance with an another aspect, a system is disclosed for printing a job ticket received from a client computer, the system comprising: one or more client devices configured to generate print jobs; a plurality of printers configured to print the print jobs; and a server having a memory and a processor, the processor configured to: collect job information on each of the plurality of print jobs; obtain a predicted success rate for each of the plurality of print jobs with each of the plurality of printers based on the job information on the each of the plurality of print jobs, the predicted success rate being a likelihood that a print job can be successfully completed by a printer; and assign each of the plurality of print jobs to one or more printers of the plurality of printers with the predicted success rate for each of the one or more printers of the plurality of print jobs being greater than a predicted success threshold.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 10 is an illustration of a table of incoming print jobs in accordance with an exemplary embodiment.

FIG. 17 is an illustration of a table of an incoming print job with an urgent or priority print job.

FIG. 33 is an illustration of a table showing a job list in accordance with another embodiment.

FIG. 34 is an illustration of table showing a job list with a prediction result in accordance with an embodiment.

FIG. 39 is an illustration of a job list with success rates in accordance with another exemplary embodiment.

DETAILED DESCRIPTION

Figure 1:
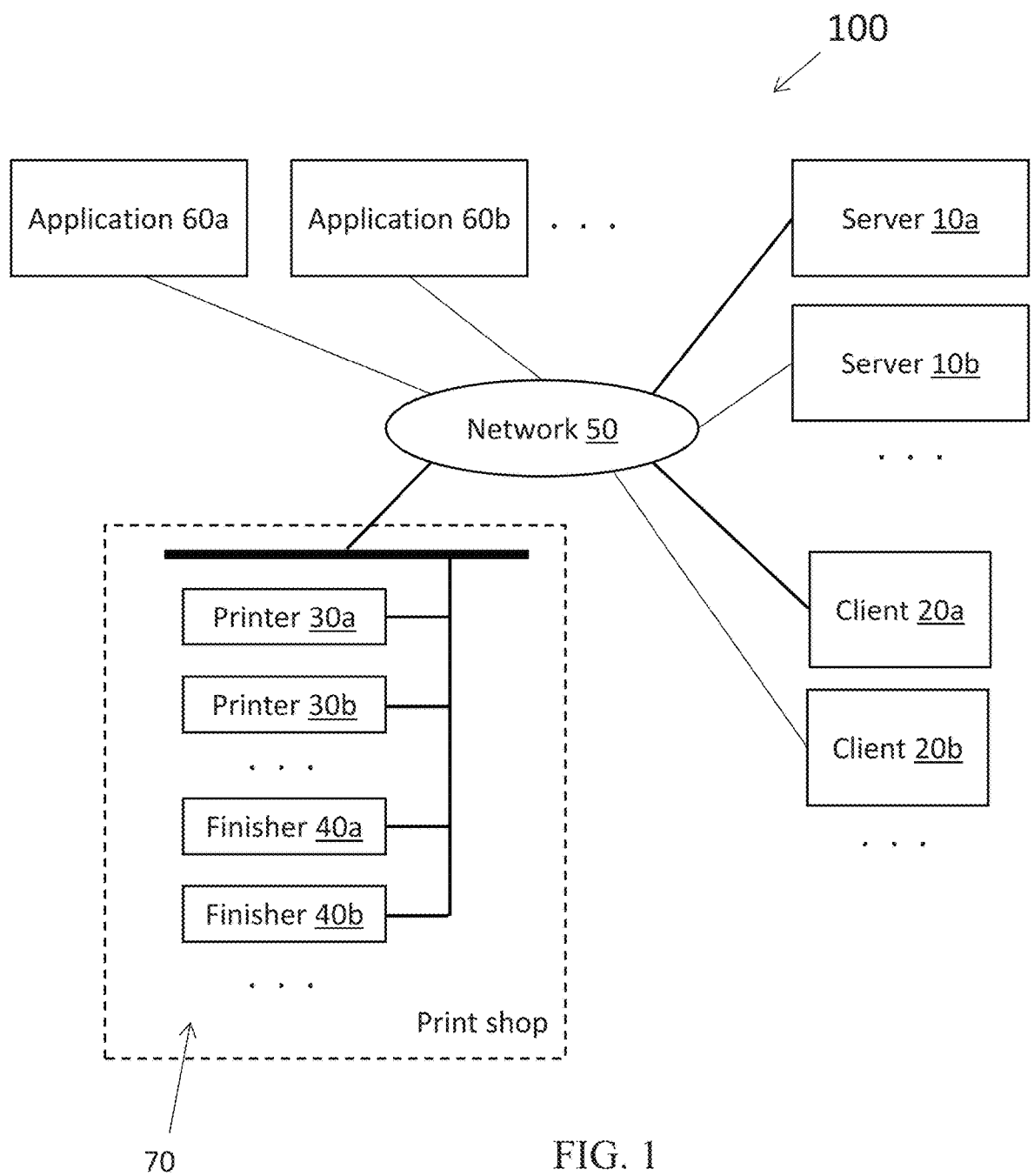
FIG. 1 is an illustration of a system for efficient job scheduling by collecting data from multiple sources in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

It would be desirable to have a method and system that collects data from multiple sources (i.e., printers, finishers, etc.) as well as estimates job submission time, job processing time, and predicts abnormal situations, and which can visualize job status and efficiently schedule jobs to maximize performance. In this way, the system is able to compute optimistic job scheduling even if urgent jobs reach to the system, any trouble happened in printers.

A method and system for efficient job scheduling by collecting data from multiple sources is disclosed, which includes estimate job processing time in each step and schedule jobs to minimize machine idling time, maximize customer's productivity, and accumulate past experience to keep improving accuracy of estimation.

In accordance with an exemplary embodiment, the method and system is configured to collect information from multiple sources. For example, the information from the multiple sources can include job input, for example, job product information; pre-processing information, which can include processing time per product type, volume, etc.; pressing (i.e., printing time), for one or more printers, which can include printer status, maintenance schedule, printing duration, and printer capabilities, for example, types of printing that can be executed by the printer, color printing and/or monochrome printing, printable paper size, and finishing options, etc.; and post-pressing (i.e., after printing), which can include device status (for example, finishers), maintenance schedule, and print duration.

In accordance with an exemplary embodiment, based on the collected data, the method and system can be configured to immediately estimates job processing time once a job is received, and based on product type, print volume, job ticket settings (for example, page insertion requests, page size, etc.), estimate pre-processing time with operator availability and/or assigning the job to an appropriate printer(s) and estimate press time and scheduling of the job to maximize productivity. For example, in accordance with an exemplary embodiment, already scheduled job(s) can be re-arranged or re-assigned to different printers within a plurality or group of printers to improve performance and output within a print shop or the like.

In accordance with an exemplary embodiment, the job input application can collect the following information on a print job, which can include job received time, product type, job ticket settings, and/or page count.

In accordance with an exemplary embodiment, estimate required time to process the pre-processing operation can be based on product type and page count. For example, product type indicates what kind of document modification is needed and page count indicates work volume. The information on the pre-processing operation can be information, which is saved to a dashboard database (i.e., a data storage module) as disclosed herein and can be will be kept and updated to improve accuracy based on actual results collected from pre-processing application.

The method and system can also collect information from a pre-processing application, which can include a number of active operators and the number of jobs that can be processed simultaneously. For example, the pre-processing information can include number of open jobs in a queue. In addition, the following information can be collected from the press application, which can include number of printers, printer information, status and capabilities of each printer, and number of jobs in a queue of each printer. In accordance with an exemplary embodiment, the press application can also include estimates required time to process press operation based on product type, print volume (for example, page count times (x) copy count), job ticket settings (e.g. duplex setting, finishing option, etc.), and printer specification. In addition, accuracy of estimation can be kept to improve actual results based on post-press times.

In accordance with an exemplary embodiment, the following information can be collected on the post-press application: number of devices, device information, status and capabilities of each device, and number of jobs in a queue of each device. In accordance with an exemplary embodiment, estimate required time to process post-press operation is based on product type, print volume, job ticket settings, and device specification. In accordance with an exemplary embodiment, as disclosed herein, the calculated times and actual times can be stored and compared to improve the accuracy of future estimation for improving actual results.

In accordance with an exemplary embodiment, based on collected information, the system will simulate job assignments and order by finding all applicable printers (i.e., printers capable of executing the job), and temporarily assigning the job to a first available printer. In accordance with an exemplary embodiment, a list of all waiting jobs (i.e., pending print jobs) assigned to the printers is generated, and for each print job in the list of all waiting jobs, the method determines whether the waiting jobs (i.e., pending jobs) can be moved to another printer within the plurality of printers, for example, within a print shop. In accordance with an exemplary embodiment, if job completion time of listing of pending jobs an any new print jobs receive, the method and system will re-scheduling the waiting jobs until the entire schedule is minimized (i.e., print jobs can be completed sooner) to reduce and maximize printer usage.

FIG. 1 is an illustration of a system 100 for efficient job scheduling by collecting data from multiple sources in accordance with an exemplary embodiment. As shown in FIG. 1, the system 100 includes one or more servers 10*a*, 10*b*, one or more client devices 20*a*, 20*b*, one or more printers 30*a*, 30*b*, one or more finishers 40*a*, 40*b*, a communication network 50, and one or more applications 60*a*, 60*b*. In accordance with an exemplary embodiment, the one or more printers 30*a*, 30*b*, and the one or more finishers 40*a*, 40*b*, can be, for example, in a print shop 70. The communication network or network 50 can be a public telecommunication line and/or a network (for example, LAN or WAN). Examples of the communication network 50 can include any telecommunication line and/or network consistent with embodiments of the disclosure including, but are not limited to, telecommunication or telephone lines, the Internet, an intranet, a local area network (LAN) as shown, a wide area network (WAN) and/or a wireless connection using radio frequency (RF) and/or infrared (IR) transmission.

In accordance with an exemplary embodiment, each of the one or more client devices 20*a*, 20*b*, can be, for example, a personal computer (PC), a laptop, a mobile computing device (e.g., tablet PC, smartphone, etc.), a server, a mainframe, or a kiosk. As shown in FIG. 1, each of the one or more servers 10*a*, 10*b*, the one or more client devices 20*a*, 20*b*, the one or more printers 30*a*, 30*b*, the one or more finishers 40*a*, 40*b*, and the one or more applications 60*a*, 60*b*, can be connected to each other by one or more communication networks 50 of any size having wired and/or wireless segments. Each of the one or more client devices 20*a*, 20*b*, can be operated by a different user (for example, individual or Customer, company, etc.) and is configured to issue print jobs.

Figure 2:
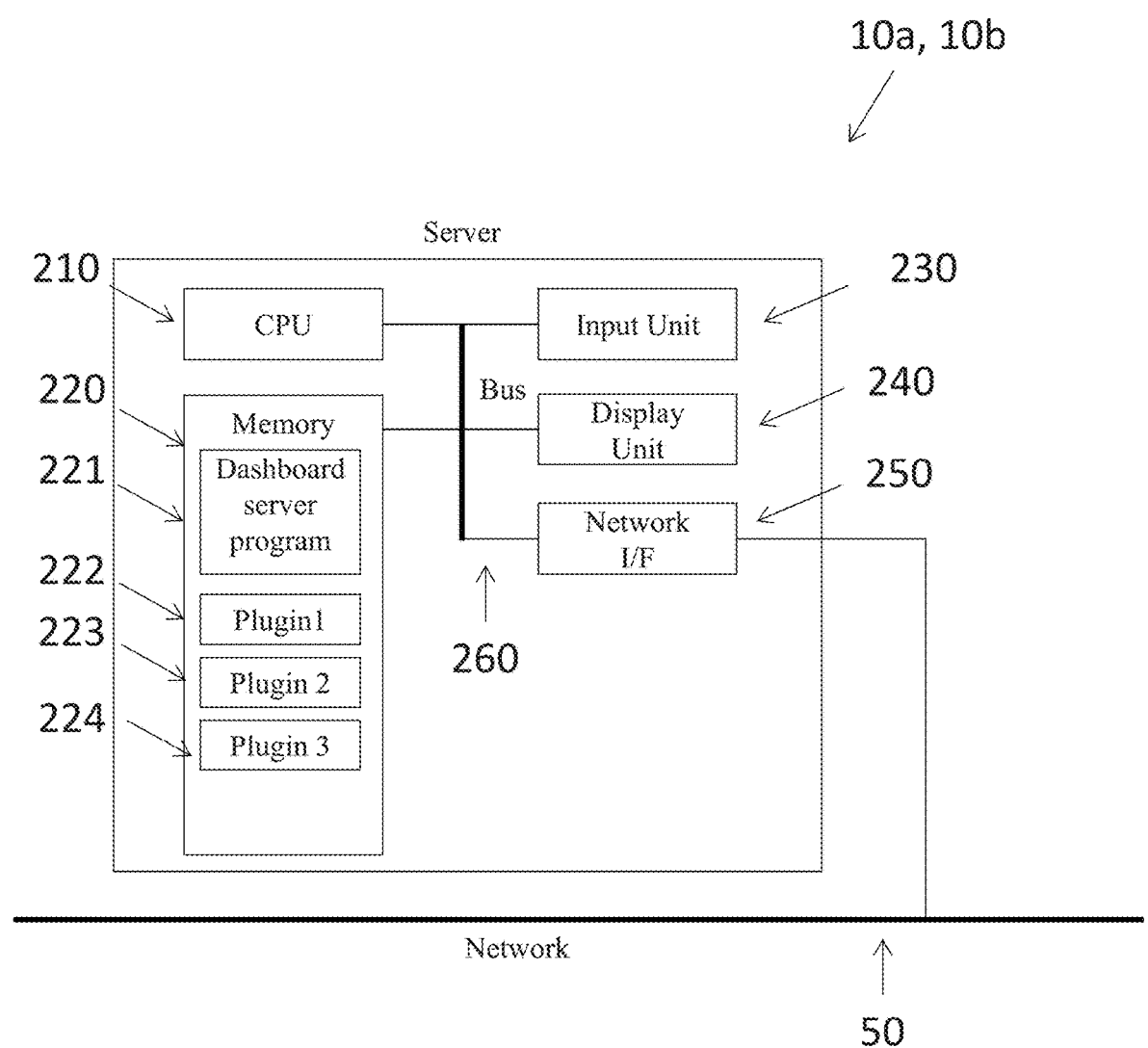
FIG. 2 is an illustration of a server in accordance with an exemplary embodiment.

FIG. 2 is an illustration of a server 10*a*, 10*b* in accordance with an exemplary embodiment. As shown in FIG. 2, each of the one or more servers 10*a*, 10*b* can include a processor or central processing unit (CPU) 210, and one or more memories 220 for storing software programs and data, which can include a dashboard server program 221, and a plurality of plugins, for example, Plugin 1 222, Plugin 2 223, and Plugin 3 224. Each of the plurality of plugins 222, 223, 224, can be a software component that adds a specific feature to an existing computer program as disclosed herein. The processor or CPU 220 is configured to carry out the instructions of a computer program, which operates and/or controls at least a portion of the functionality of the server 10*a*, 10*b*. The server 10*a*, 10*b* can also include an input unit 230, a display unit or graphical user interface (GUI) 240, and a network interface (I/F) 250, which is connected to a communication network (or network) 50. A bus 260 can connect the various components 210, 220, 230, 240, and 250 within server 10*a*, 10*b*. The server 10*a*, 10*b* includes an operating system (OS), which manages the computer hardware and provides common services for efficient execution of various software programs as disclosed herein.

Figure 3:
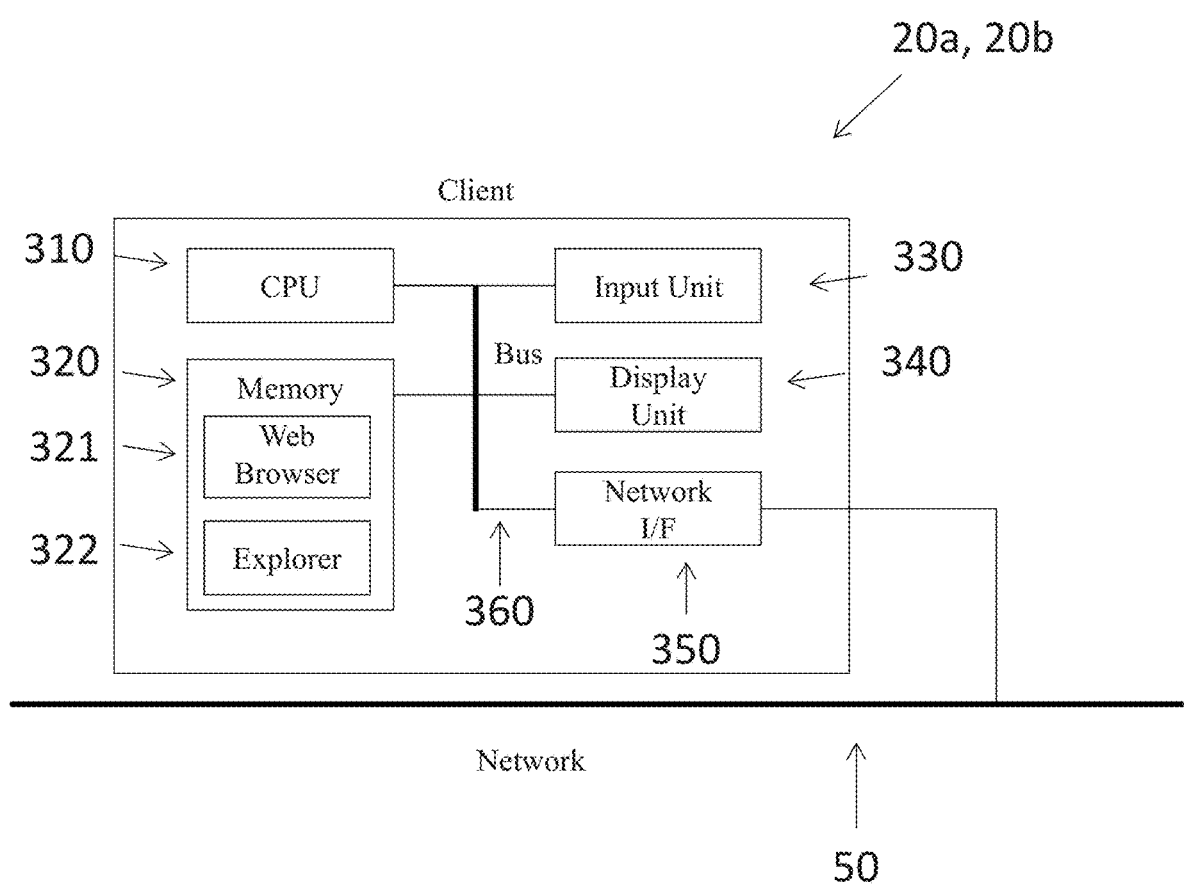
FIG. 3 is an illustration of a client device or client computer in accordance with an exemplary embodiment.

FIG. 3 is an illustration of a client device or client computer 20*a*, 20*b* in accordance with an exemplary embodiment. As shown in FIG. 3, the client device or client computer 20*a*, 20*b* the exemplary host computer or client computer 20 can include a processor or central processing unit (CPU) 310, and one or more memories 320 for storing software programs and data (such as files to be printed), and a web browser 321, for example, Internet Explorer 322. The processor or CPU 310 carries out the instructions of a computer program, which operates and/or controls at least a portion of the functionality of the client computer 20*a*, 20*b*. The client computer 20*a*, 20*b* can also include an input unit 330, a display unit or graphical user interface (GUI) 340, and a network interface (I/F) 350, which is connected to a communication network (or network) 50. A bus 360 can connect the various components 310, 320, 330, 340, and 350 within the client computer 20*a*, 20*b*.

The client computer 20*a*, 20*b* includes an operating system (OS), which manages the computer hardware and provides common services for efficient execution of various software programs. The software programs can include, for example, application software and printer driver software. In addition, the printer driver software can control transmission of the print job from the client computer 20*a*, 20*b* to the one or more servers 10*a*, 10*b*, the one or more printers or printing devices 30*a*, 30*b*, and the one or more finishers 40*a*, 40*b*.

Figure 4:
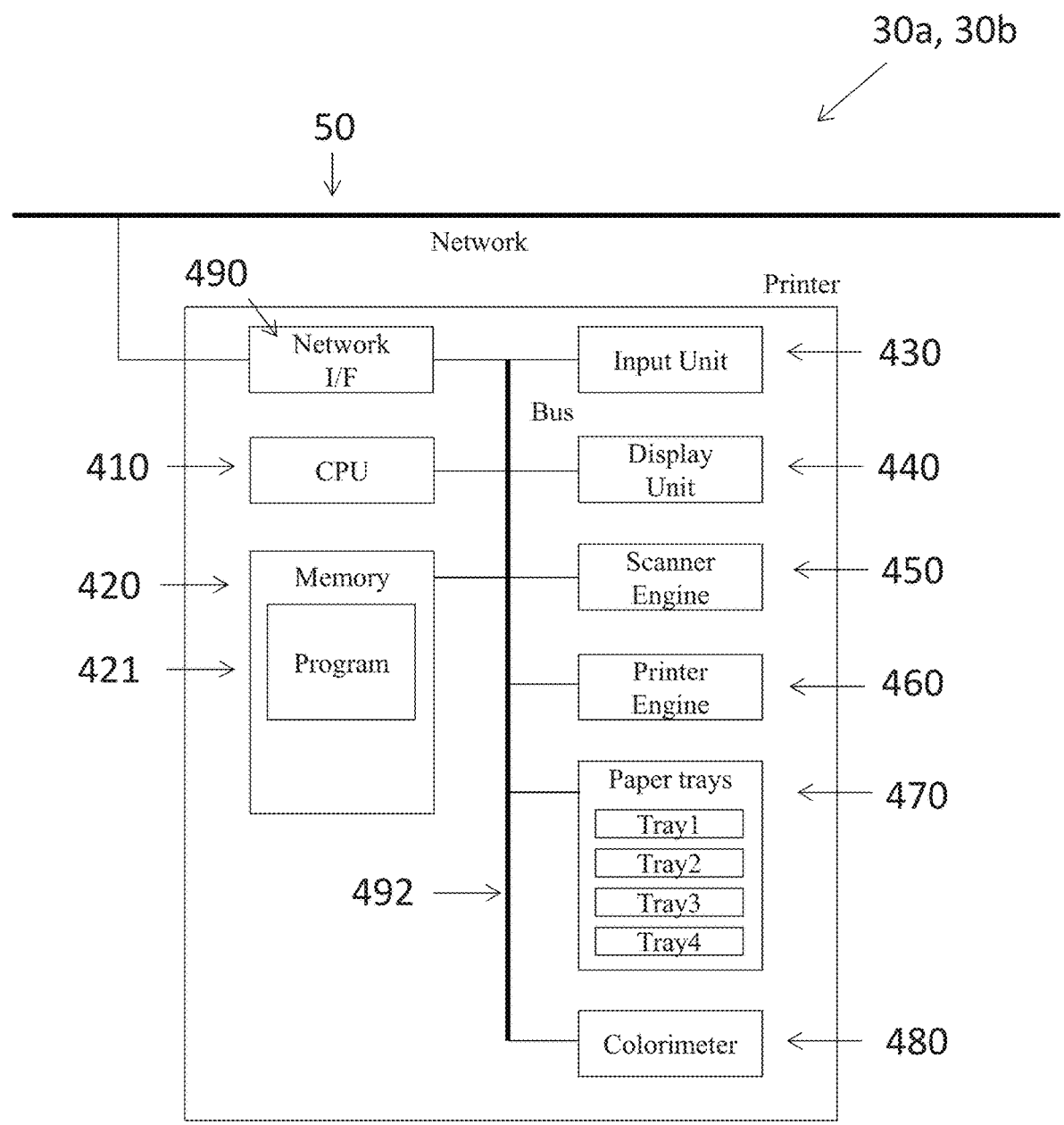
FIG. 4 is an illustration of a printer or printing device in accordance with an exemplary embodiment.

FIG. 4 is an illustration of a printer or printing device 30*a*, 30*b* in accordance with an exemplary embodiment. As shown in FIG. 4, the printer or printing device 30*a*, 30*b* can include a network interface (I/F) 490, which is connected to the communication network (or network) 50, a processor or central processing unit (CPU) 410, and one or more memories 420 for storing software programs and data (such as files to be printed) 421. For example, the software programs 421 can include a printer controller and a tray table. The processor or CPU 410 carries out the instructions of a computer program, which operates and/or controls at least a portion of the functionality of the printer 30*a*, 30*b*. The printer 30*a*, 30*b* can also include an input unit 430, a display unit or graphical user interface (GUI) 440, a scanner engine (or scanner) 450, a printer engine 460, a plurality of paper trays 470, and a colorimeter 480.

In accordance with an exemplary embodiment, the colorimeter 480 can be an inline colorimeter (ICCU) (or spectrophotometer), which measures printed color patches in order to generate color profiles. In accordance with an exemplary embodiment, for example, the colorimeter (or spectrophotometer) 411 can be one or more color sensors or colorimeters, such as an RGB scanner, a spectral scanner with a photo detector or other such sensing device known in the art, which can be embedded in the printed paper path, and an optional finishing apparatus or device (not shown). A bus 492 can connect the various components 410, 420, 430, 440, 450, 460, 470, 480, and 490 within the printer 30*a*, 30*b*. The printer 30*a*, 30*b* also includes an operating system (OS), which manages the computer hardware and provides common services for efficient execution of various software programs. In accordance with an exemplary embodiment, it can be within the scope of the disclosure for the printer 30*a*, 30*b* to be a copier.

For example, in accordance with an exemplary embodiment, an image processing section within the printer 30*a*, 30*b* can carry out various image processing under the control of a print controller or CPU 410, and sends the processed print image data to the print engine 4460. The image processing section can also include a scanner section (scanner engine 450) for optically reading a document, such as an image recognition system. The scanner section receives the image from the scanner engine 450 and converts the image into a digital image. The print engine 460 forms an image on a print media (or recording sheet) based on the image data sent from the image processing section. The central processing unit (CPU) (or processor) 410 and the memory 420 can include a program for RIP processing (Raster Image Processing), which is a process for converting print data included in a print job into Raster Image data to be used in the printer or print engine 460. The CPU 410 can include a printer controller configured to process the data and job information received from the one or more servers 10*a*, 10*b*, or the one or more client computers 20*a*, 20*b*, for example, received via the network connection unit and/or input/output section (I/O section) 490.

The CPU 410 can also include an operating system (OS), which acts as an intermediary between the software programs and hardware components within the multi-function peripheral. The operating system (OS) manages the computer hardware and provides common services for efficient execution of various software applications. In accordance with an exemplary embodiment, the printer controller can process the data and job information received from the one or more client computers 20a, 20b to generate a print image.

In accordance with an exemplary embodiment, the network I/F 490 performs data transfer with the one or more servers 10a, 10b, and the one or more client devices 20a, 20b. The printer controller can be programmed to process data and control various other components of the multi-function peripheral to carry out the various methods described herein. In accordance with an exemplary embodiment, the operation of printer section commences when the printer section receives a page description from the one or more servers 10a, 10b, and the one or more client devices 20a, 20b via the network I/F 490 in the form of a print job data stream and/or fax data stream. The page description may be any kind of page description languages (PDLs), such as PostScript® (PS), Printer Control Language (PCL), Portable Document Format (PDF), and/or XML Paper Specification (XPS). Examples of printers 30a, 30b consistent with exemplary embodiments of the disclosure include, but are not limited to, a multi-function peripheral (MFP), a laser beam printer (LBP), an LED printer, a multi-function laser beam printer including copy function.

In accordance with an exemplary embodiment, the printer 30a, 30b can also include at least one auto tray or paper tray 470, and more preferably a plurality of auto trays or paper trays. Each auto tray or paper tray 470 can include a bin or tray, which holds a stack of a print media (not shown), for example, a paper or a paper-like product. The printer engine or print engine 460 has access to a print media of various sizes and workflow for a print job, which can be, for example, stored in the input tray. A "print job" or "document" can be a set of related sheets, usually one or more collated copy sets copied from a set of original print job sheets or electronic document page images, from a particular user, or otherwise related.

In accordance with an exemplary embodiment, the print media is preferably a paper or paper-like media having one or more print media attributes. The print media attributes can include, for example, paper color, coating, grain direction, printing technology, brightness, CIE, tint, whiteness, lab-Color, etc. In order to maximize print quality, the print media attributes of each type of print media should be input into or hosted on the printer 30a, 30b, for example, on printer configuration settings of the printer 30a, 30b to obtain the highest quality output. Most print media is provided in reams or other known quantities, which are packaged with indicia such as information on the manufacture, size, type and other attributes of the print media. In addition, most bundles or reams of paper include a UPC (Universal Product Code) or bar code, which identifies the type of print media including manufacture of the print media.

Figure 5:
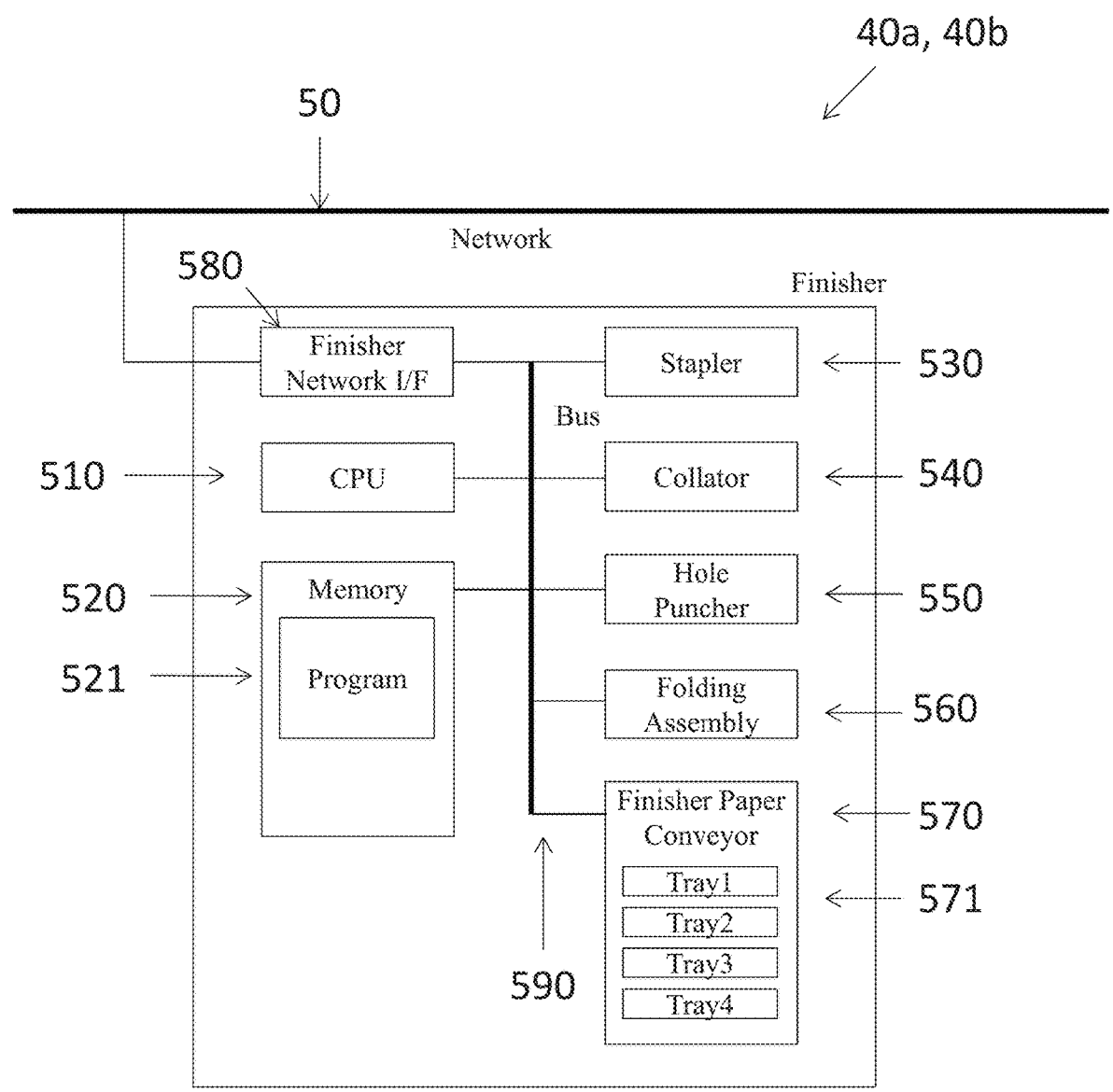
FIG. 5 is an illustration of a finisher in accordance with an exemplary embodiment.

FIG. 5 is an illustration of a finisher 40a, 40b in accordance with an exemplary embodiment. As shown in FIG. 5, the finisher 40a, 40b can include a network interface (I/F) 580, which is connected to the communication network (or network) 50, a processor or central processing unit (CPU) 510, and one or more memories 520 for storing software programs and data (such as files to be printed) 521. The processor or CPU 510 carries out the instructions of a computer program, which operates and/or controls at least a portion of the functionality of the finisher 40a, 40b. The finisher 40a, 40b can also include a stapler 530, a collator 540, a hole puncher 550, a folding assembly 560, and a finisher paper conveyor 570, which includes a plurality of trays 571. A bus 590 can connect the various components 510, 520, 530, 540, 550, 560, 570, and 580 within the finisher 40a, 40b. The finisher 40a, 40b also includes an operating system (OS), which manages the computer hardware and provides common services for efficient execution of various software programs.

The CPU 510 can also include an operating system (OS), which acts as an intermediary between the software programs and hardware components within the multi-function peripheral. The operating system (OS) manages the computer hardware and provides common services for efficient execution of various software applications. In accordance with an exemplary embodiment, the network I/F 580 performs data transfer with the one or more servers 10a, 10b, the one or more client devices 20a, 20b, and the one or more printers 30a, 30b.

Figure 6:
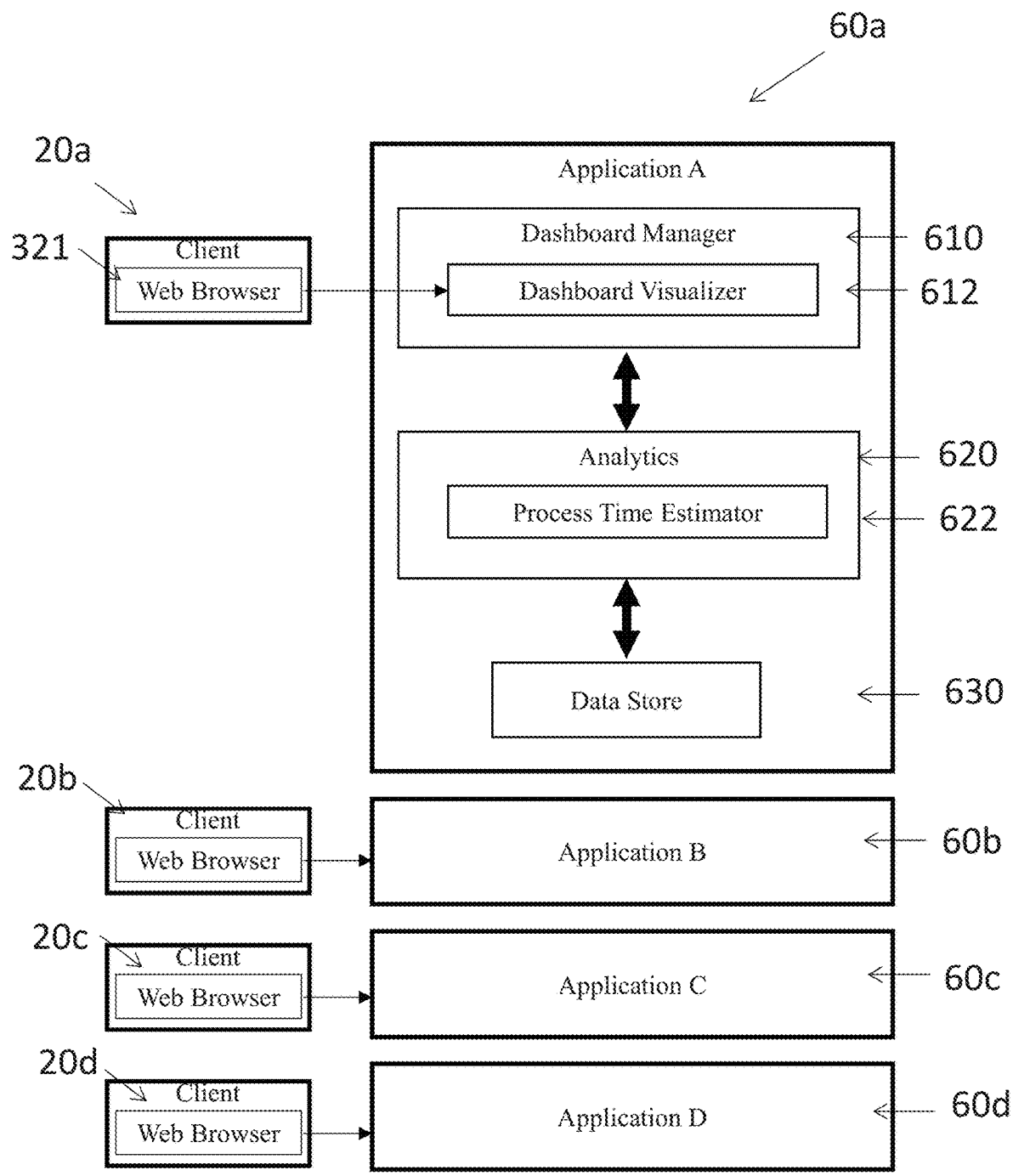
FIG. 6 is an illustration of an application having a dashboard manager in accordance with an exemplary embodiment.

FIG. 6 is an illustration of an application 60a, 60b having a dashboard manager 610 in accordance with a conventional embodiment. As shown in FIG. 6, each application 60a, 60b, 60c, 60d includes a dashboard manager 610 having a dashboard visualizer 612. The dashboard manager 610 receives data from the client 20a via a web browser 321 for a job, for example, a print job. The data is received by the dashboard manager 610, which is input into an analytic processor 620, which estimates, for example, process time 622 for the job, and the data is stored in the dashboard manager 610. As shown in FIG. 6, each job is received by a separate application 60b, 60c, and/or 60d from a web browser of a corresponding client 20b, 20c, 20d.

Figure 7:
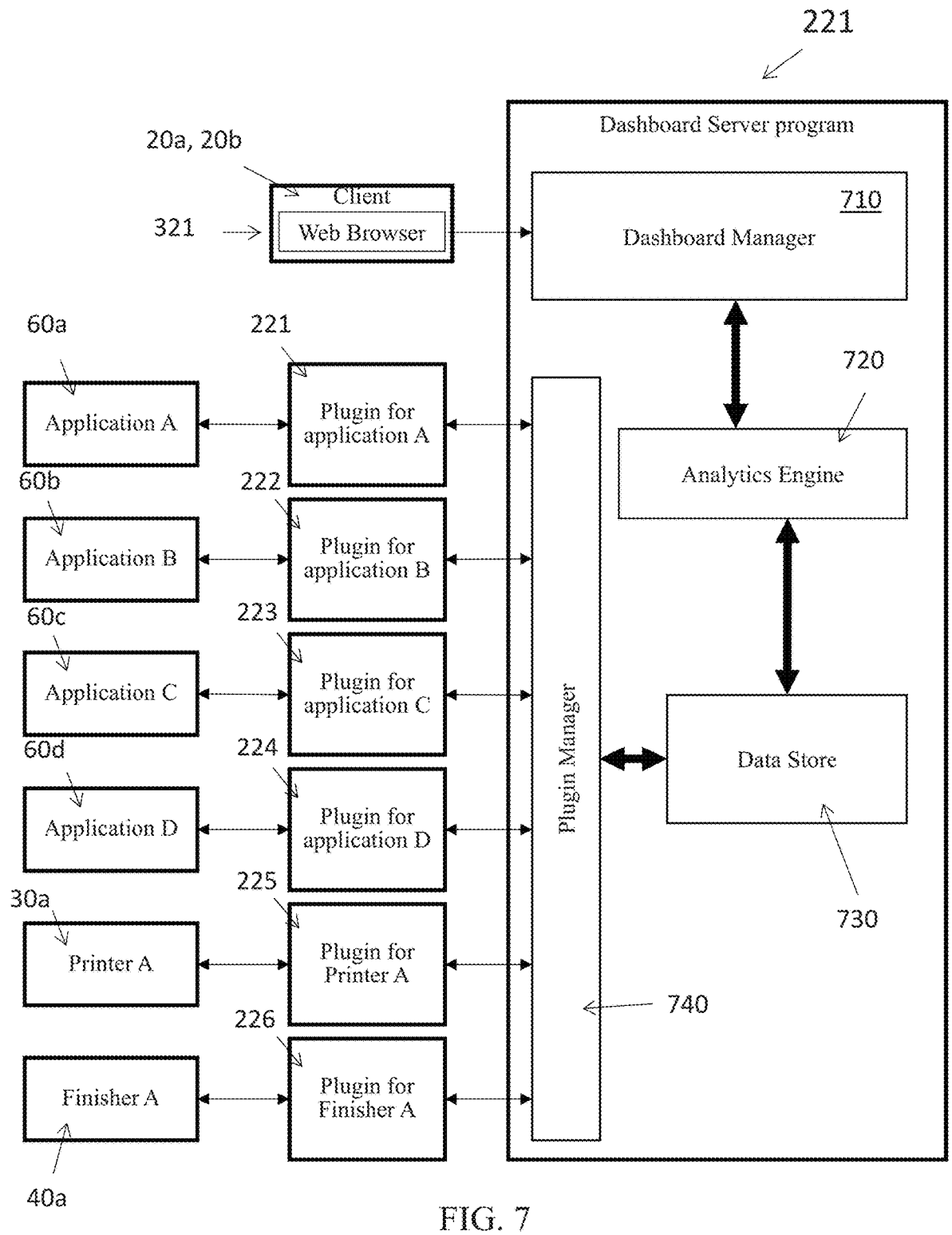
FIG. 7 is an illustration of a dashboard server program in accordance with an exemplary embodiment.

FIG. 7 is an illustration of a dashboard server program 221 in accordance with an exemplary embodiment. As shown in FIG. 7, the dashboard server program 221 is preferably hosted on one or more servers 10a, 10b, and includes a dashboard manager 710. The dashboard manager 710 is configured to receive data from one or more client devices 20a, 20b, via a web browser 321 in connection with a plural of jobs, for example, a plurality of print jobs. The dashboard manger 710 communicates with an analytics engine 720. The analytics engine 720 communicates with a data storage module 730, which is in communication with a plugin manager 740. In accordance with an exemplary embodiment, the plugin manager 740 is in communication with a plurality of applications 60a, 60b, 60c, 60d, one or more printers 30a, and one or more finishers 40a. Each of the plurality of applications 60a, 60b, 60c, 60d, the one or more printers 30a, and the one or more finishers 40a has a corresponding plugin 221, 222, 223, 224, 225, 226, which is in direct communication with the plugin manager 740 of the dashboard server program 221.

Figure 8:
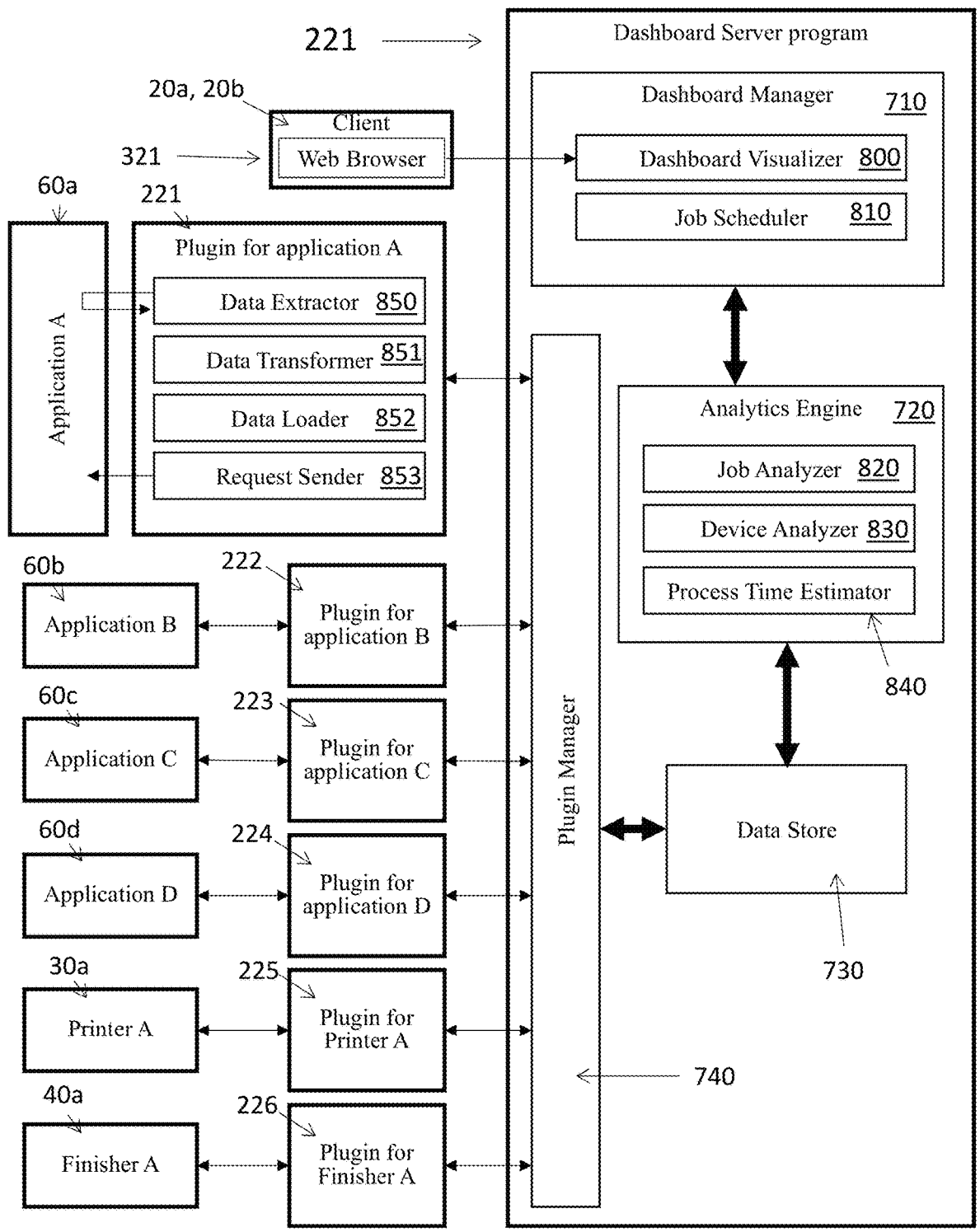
FIG. 8 is an illustration of a dashboard server program in accordance with another exemplary embodiment.

FIG. 8 is an illustration of a dashboard server program 221 in accordance with another exemplary embodiment. As shown in FIG. 8, the dashboard server program 211 includes the dashboard manager 710, which includes a dashboard visualizer 800 and a job scheduler 810. The dashboard manager 710 is in communication with the one or more clients 20a, 20b, and the corresponding Web browser 321 and receives data on jobs, for example, print jobs, from the one or more clients 20a, 20b. The analytics engine 720 can include a job analyzer 820, a device analyzer 830 and a process time estimator 840. The analytics engine 720 and the dashboard manager 710 being in communication with one another. The analytics engine 720 also being in communication with a data storage module 730. In accordance with an exemplary embodiment, the data storage module 730 is in communication with the plugin manager 740.

In accordance with an exemplary embodiment, as shown in FIGS. 7 and 8, the plugin manager 740 is in communication with a plurality of applications 60a, 60b, 60c, 60d, one or more printers 30a, and one or more finishers 40a. Each of the plurality of applications 60a, 60b, 60c, 60d, the one or more printers 30a, and the one or more finishers 40a has a corresponding plugin 221, 222, 223, 224, 225, 226, which is in direct communication with the plugin manager 740 of the dashboard server program 221. In accordance with an exemplary embodiment, the plugin for application A 221 can be configured to include a data extractor 850, a data transformer 851, a data loader 852, and a request sender 853, which can provide data to the plugin manager 740 on one or more jobs, for example, print jobs.

Figure 9:
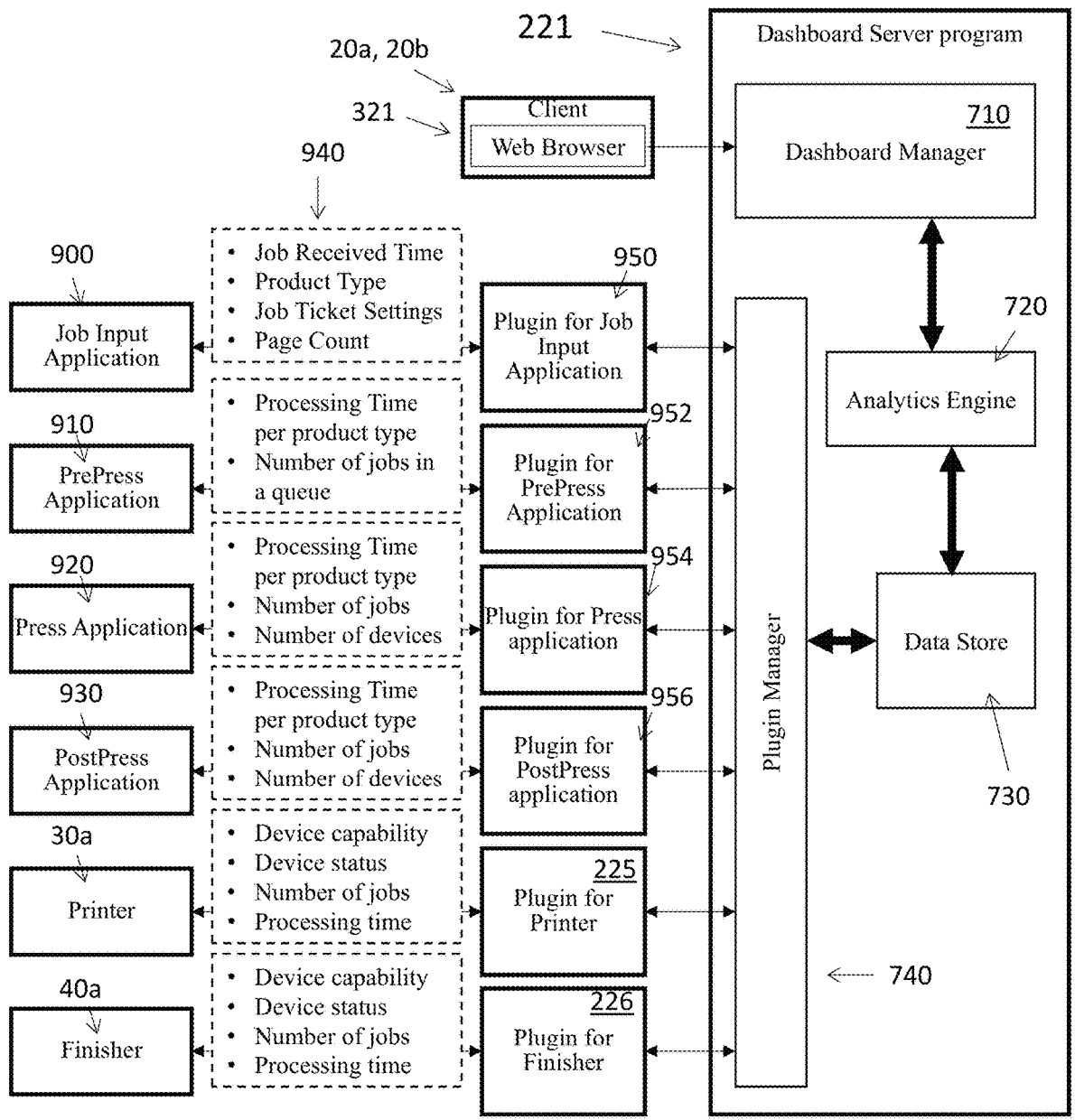
FIG. 9 is an illustration of a dashboard server program with data collection in accordance with an exemplary embodiment.

FIG. 9 is an illustration of a dashboard server program 221 with data collection in accordance with an exemplary embodiment. As shown in FIG. 9, the dashboard server program 211 includes the dashboard manager 710, which is in communication with the one or more clients 20a, 20b, and the corresponding Web browser 321 and receives data on jobs, for example, print jobs, from the one or more clients 20a, 20b. The analytics engine 720 and the dashboard manager 710 being in communication with one another. The analytics engine 720 also being in communication with a data storage module 730. The data storage module 730 being in communication with the plugin manager 740.

In accordance with an exemplary embodiment, as shown in FIG. 9, the plugin manager 740 is in communication with a plurality of applications, for example, the plurality of applications can include a job input application 900, a pre-processing application 910, a press application 920, a post-press application 930, one or more printers 30a, and one or more finishers 40a. The job input application 910 can be configured to collect job product information. The pre-processing application 910 can be configured to collect processing time per product type, volume, etc. The press application 920 can be configured to collect printer status, maintenance schedule, printing duration, etc. The post-press application 930 can be configured to collect device status, maintenance schedule, printing durations, etc.

In accordance with an exemplary embodiment, the job input application 900 can provide data 940, for example, job received time, product type, job ticket settings, and page count to a plugin for the job input application 950, which is then provided to the plugin manager 740. The pre-processing application 910 can provide data 940, for example, processing time per product type, and number of jobs in a queue to the plugin for the pre-processing application 952. The press application 920 can provide data 940, for example, processing time per product type, number of jobs, and number of devices, to the plugin for the press application 954. The printer 30a can provide data 940, for example, device capability, device status, number of jobs, and processing time, to the plugin for the printer 225. The finisher 40a, 40b can provide data 940, for example, device capability, device status, number of jobs, and processing time to the plugin for the finisher 226.

In accordance with an exemplary embodiment, the storing the calculated pre-processing time and the calculating processing time for the new print job can be stored in the date storage module (i.e., database) 730 as disclosed herein. In addition, an actual pre-processing time and an actual processing time for the new print job can be stored in the data storage module (i.e., database) 730. In accordance with an exemplary, a subsequent pre-processing time and a processing time for a subsequent print job can be calculated by comparing the calculated pre-processing time and the calculated processing time to the actual pre-processing time and the actual processing time, respectively.

FIG. 10 is an illustration of a table 1000 of incoming print jobs in accordance with an exemplary embodiment. As shown in FIG. 10, the incoming print jobs and corresponding data (or print parameters) can include, for example, job name, product type, priority, color, page count, copies (for example, number of copies), finishing, cluster, and a job received time. In accordance with an exemplary embodiment, the product type can include, for example, brochure, book, manual, DM (direct mail), business cards (i.e., Biz Card), statement, book, and/or collateral. The priority can be normal or urgent (FIG. 17). The color can be black and white (i.e., B&W) or color. The page count can be for example, between 1 and 1000, for example, as shown 50, 100, 150, 200, 300, and 400 pages. The number of copies can be, for example, between 1 and 1000. The finishing can be stitching, none, punching, and/or folding. The clustering can be No or Yes. The time received can be stored as a time and date.

Figure 11:
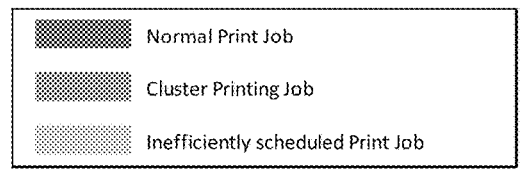
FIG. 11 is an illustration of an exemplary user interface of job scheduling per printer with a conventional application.

FIG. 11 is an illustration of an exemplary user interface (or job scheduling screen) 1100 of job scheduling per printer with a conventional application. As shown in FIG. 11, the user interface 1100 is configured to illustrate each printer, i.e., Printer 1, Printer 2, Printer 3, . . . , the type or capabilities of each printer, for example, Black & White or Color, and finishing options, for example, Stitching, Punching, and/or Folding. Upon receipt of a print job, the print job is placed in a queue for printing and the corresponding time period in which the print job is scheduled to be printed is displayed. The print jobs as shown in FIG. 11 can include normal print jobs (Jobs 1, 2, 3, 4, 5, 6, 8, 9, 10, and 12), cluster printing jobs (Jobs 7 and 16), and inefficiently scheduled print jobs (Jobs 11, 14, and 15).

Figure 12:
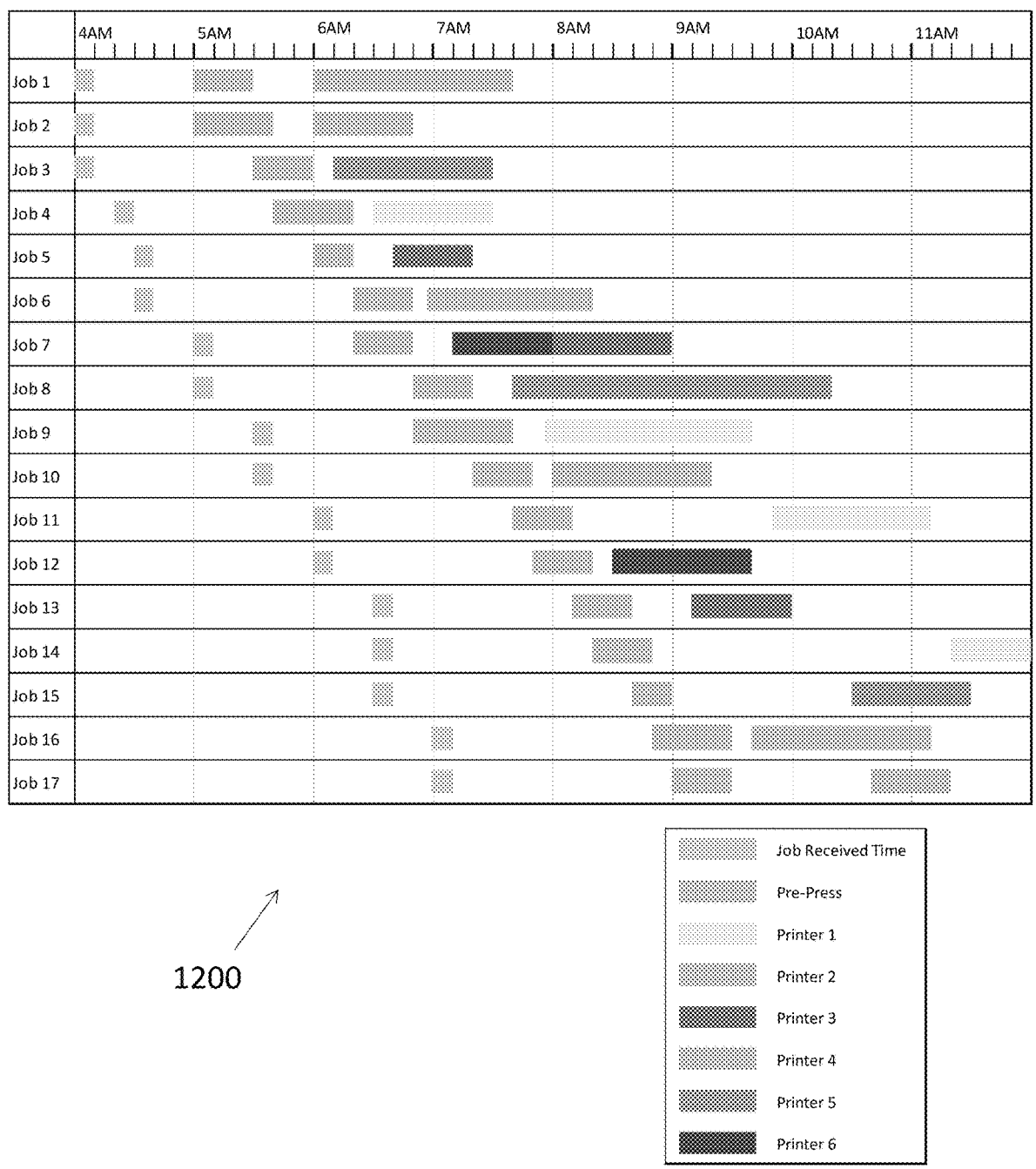
FIG. 12 is an illustration of another exemplary user interface of job scheduling per job with a conventional application.

FIG. 12 is an illustration of another exemplary user interface (or job scheduling screen) 1200 of job scheduling per job with a conventional application. As shown in FIG. 12, the user interface 1200 is configured to illustrate each job and a corresponding time line for each job including job receiving time, a pre-press time, and corresponding assignment of the job to one or more of the plurality of printers (i.e., Printer 1, Printer 2, Printer 3, Printer 4, Printer 5, Printer 6).

Figure 13:
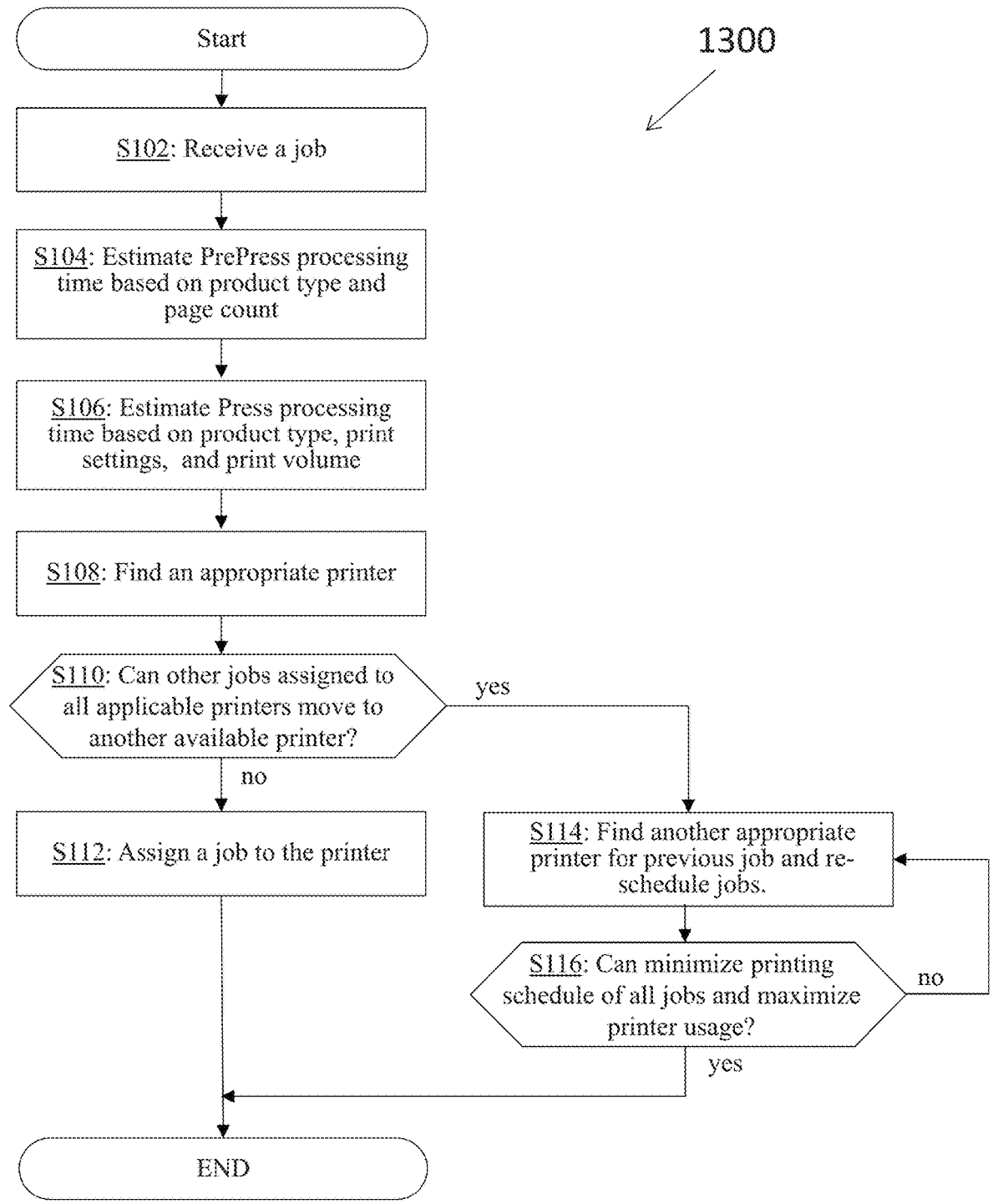
FIG. 13 is an illustration of a flow chart illustrating job scheduling in accordance with an exemplary embodiment.

FIG. 13 is an illustration of a flow chart 1300 illustrating job scheduling in accordance with an exemplary embodiment. As shown in FIG. 13, in step S102, the dashboard server program 221 receives a new job. In step S104, the dashboard manager 710 estimates Pre-processing processing time based on product type and page count for the new job. In step S106, the dashboard manager 710 estimates press processing time based on product type, print settings, and print volume for the new jobs. In step S108, the dashboard manager 710 determines (i.e., finds) an appropriate printer 30a, 30b (i.e., selected printer 30a, 30b) for the new job and temporarily assigns the new job to the printer 30a, 30b.

In step S110, the dashboard manager 710 determines if the previous jobs waiting to be processed and assigned to one of the applicable printers (i.e., plurality of printers, for example, in the print shop) can be moved to another available printer 30a, 30b. If one of the previous jobs cannot be moved to another available printer 30a, 30b, the new job is assigned to the selected printer 30a, 30b, for example, in a first in, first out (FIFO) process. In accordance with an exemplary embodiment, upon assigning the new job to a printer 30a, 30b, the new job can be placed in a print queue, and the printer 30a, 30b, prints the jobs in the order received. If another job (i.e., one of the previously assigned jobs being assigned to a specific printer of the plurality of printers) can be assigned to another printer, in step S114, another appropriate printer is found for the previous job and the other previous jobs are rescheduled.

In step S116, a determination is made if the rescheduling and/or reassigning of the previous jobs to another printer can minimize printing schedule of all previous jobs and the new job to maximize printer usage. If the rescheduling and/or reassigning of the previous jobs to the another printer does not minimize the printing schedule of the jobs including the previous jobs and the new job to maximize printer usage, the process returns to step S114 to determine if another printer is available for the previous job and re-scheduling of the previous jobs can be performed to minimize the printing schedule of all jobs and maximize printer usage. In step S116, if the re-scheduling of the previous jobs can minimize the printing schedule of all jobs and maximize printer usage, the previous jobs are assigned and/or reassigned in accordance with the determination in step S114.

In accordance with an exemplary embodiment, the assigning of the new print job to the at least one printer of the plurality of printers in step S112 (S218, S318, S418, S516) comprises temporarily assigning the new print job to the at least one printer of the plurality of printers only when none of the previous jobs can be reassigned or moved to another printer of the plurality printers.

In accordance with an exemplary embodiment, in steps S114, S116, (S220, S222, S320, S322, S420, S422, S512, S514, S518, 520) the determination if the one or more of the plurality of print jobs can be reassigned to another printer of the plurality of printers to minimize a print schedule for each of the plurality of print jobs can include attempting to re-assigning each of the one or more of the plurality of print jobs to another printer of the plurality of printers when the reassigning of the one or more of the plurality of print jobs minimizes the print schedule of the plurality of print jobs. In addition, the dashboard manager 710 can be configured to continue to the re-assigning of each of the one or more of the plurality of print jobs to another printer of the plurality of printers when the reassigning of the one or more of the plurality of print jobs minimizes the print schedule of the plurality of print jobs.

Figure 14:
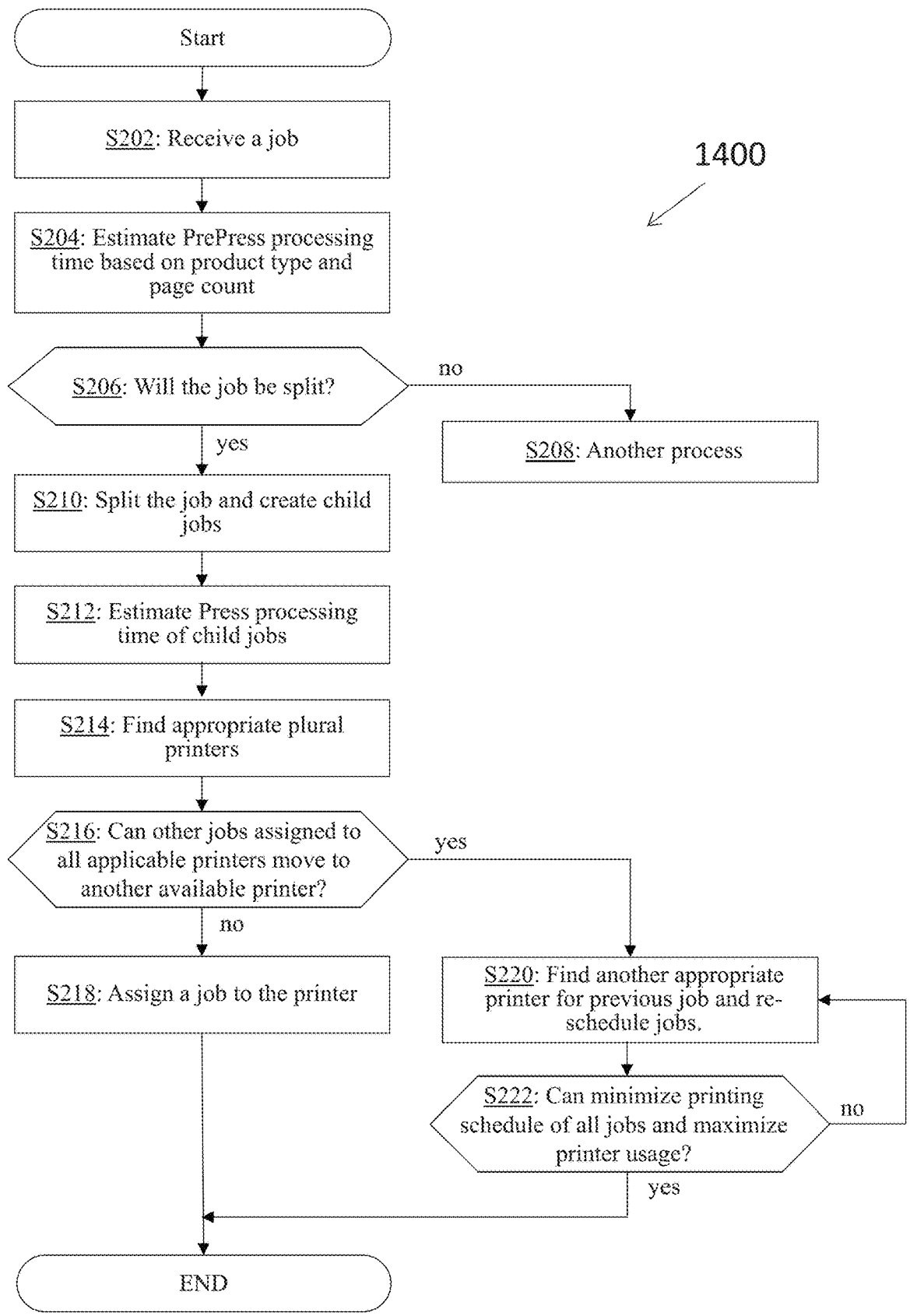
FIG. 14 is an illustration of a flow chart illustrating job scheduling with a clustering option enabled in accordance with an exemplary embodiment.

FIG. 14 is an illustration of a flow chart 1400 illustrating job scheduling with a clustering option enabled in accordance with an exemplary embodiment. As shown in FIG. 14, in step S202, the dashboard server program 221 receives a new job. In step S204, the dashboard manager 710 estimates Pre-processing processing time based on product type and page count for the new job. In step S206, the dashboard manager 710 determines if the new job can be split into two or more jobs and assigned to two or more printers (i.e., a cluster print job). For example, if the new job contains images and data, which need to be printed on a color printer, and wherein a portion of the new job can be assigned to color printer, and a portion of the new job can be assigned to a black and white printer. Alternatively, the cluster print job can be a relatively large print job that is split between two or more printers, for example, two (2) printer or four (4) printers. If the new job cannot be split into two or more jobs and assigned to two or more printers, the process continues to step S208, wherein the new job can be executed, for example, as disclosed in FIG. 13, and wherein the new job is not split into two or more print jobs.

In accordance with an exemplary embodiment, if the new job can be split into two or more print jobs, the process continues to step S210, where the new job is split into, for example, two or more child jobs (i.e., the new job is split into a first new job, a second new job, etc.). In step S212, the dashboard manager estimates press processing time based on product type, print settings, and print volume for each of the child jobs. In step S214, the dashboard manager 710 determines (i.e., finds) appropriate printers 30a, 30b for each of the child jobs. In step S216, the dashboard manager 710 determines if another job (i.e., previously assigned job, the previously assigned job being assigned to a specific printer of the plurality of printers) can be assigned to all applicable printers be moved to another available printer 30a, 30b. In step S216, the new print job is temporarily assigned to a printer 30a, 30b.

In accordance with an exemplary embodiment, if a previously job cannot be moved to another available printer 30a, 30b, each of the child jobs are assigned to the printer 30a, 30b determined in step S214. If a previous job can be assigned to another printer, in step S220, another appropriate printer is found for the previous job and the previous jobs are rescheduled. In accordance with an exemplary embodiment in step S222, a determination is made if the rescheduling and/or reassigning of the previous job to another printer can minimize printing schedule of all jobs (i.e., all previous jobs and the new job) and maximize printer usage. If the rescheduling and/or reassigning of the previous job to the another printer does not minimize the printing schedule of all jobs and maximize printer usage, the process returns to step S220 to determine if another printer is available for the previous job and if the re-scheduling of the previous jobs can be performed to minimize the printing schedule of all jobs and maximize printer usage. In step S222, if the re-scheduling of the jobs can minimize the printing schedule of all jobs (i.e., all previous jobs and the new job) and maximize printer usage, the previous job (or previous jobs) is assigned and/or reassigned in accordance with the determination in step S220.

Figure 15:
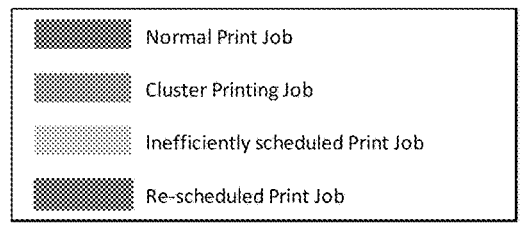
FIG. 15 is an illustration of an exemplary user interface of job scheduling per printer with a dashboard server in accordance with an exemplary embodiment.

FIG. 15 is an illustration of an exemplary user interface (or job scheduling screen) 1500 of job scheduling per printer with a dashboard server in accordance with an exemplary embodiment. As shown in FIG. 15, the user interface 1500 is configured to illustrate each printer, i.e., Printer 1, Printer 2, Printer 3, . . . , the type or capabilities of each printer, for example, Black & White or Color, and finishing options, for example, Stitching, Punching, and/or Folding. Upon receipt of a print job, the print job is place in a queue for printing and the corresponding time period in which the print job is scheduled to be printed is displayed. The print jobs as shown in FIG. 15 can include normal print jobs (Jobs 1, 2, 3, 4, 5, 6, 13, and 17), cluster printing job or cluster print jobs (Jobs 7 and 16), inefficiently scheduled print jobs (Jobs 11, 14, and 15), and re-scheduled print job (Jobs 8, 9, 10, and 12). In accordance with an exemplary embodiment, the job schedule screen is a two dimensional chart in which a first axis indicated an execution length of time for each of the print jobs and the new print job, and in which a second axis shows each of the plurality of printers.

Figure 16:
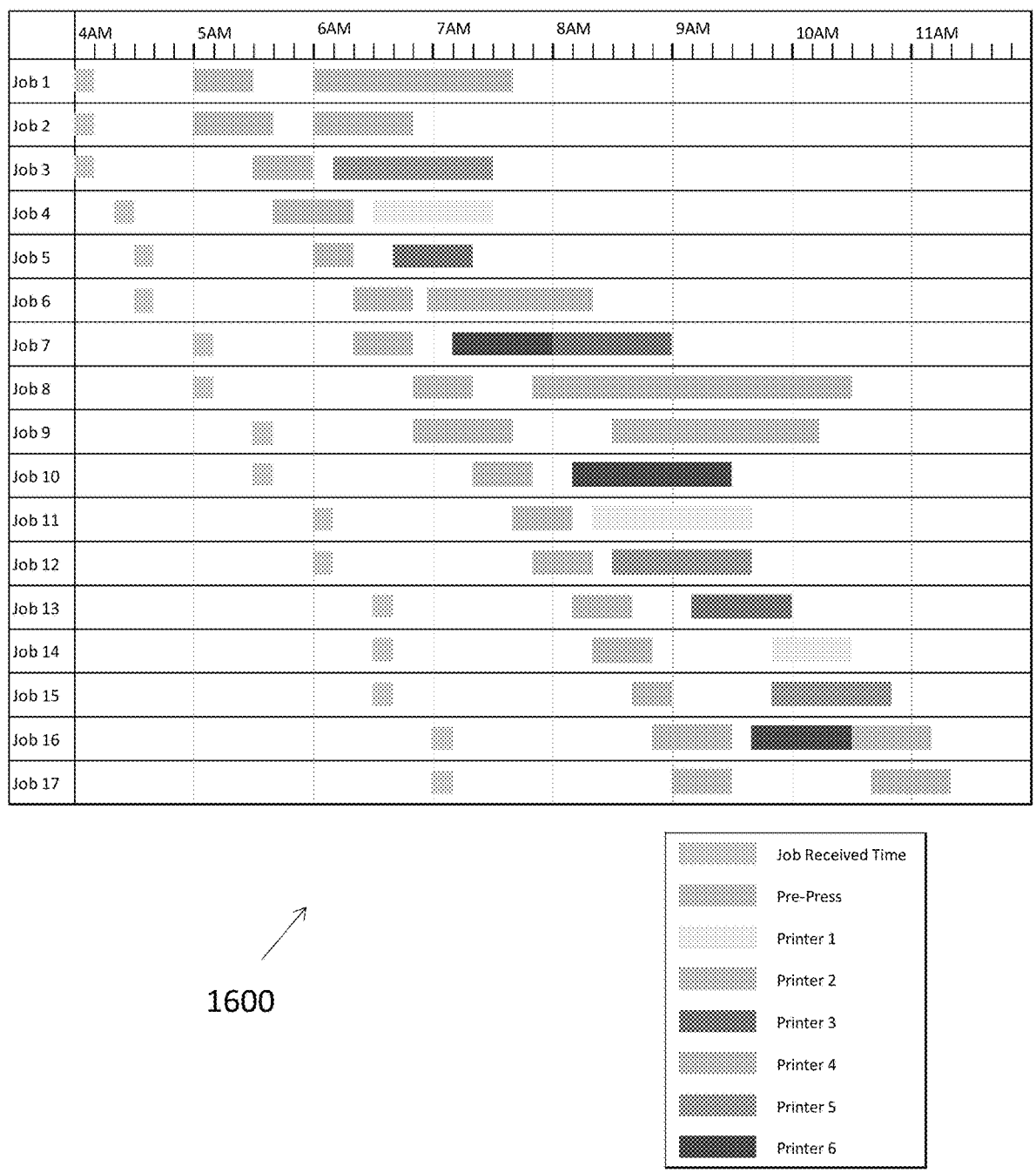
FIG. 16 is an illustration of an exemplary user interface of job scheduling per job in accordance with an exemplary embodiment.

FIG. 16 is an illustration of an exemplary user interface (or job scheduling screen) 1600 of job scheduling per job in accordance with an exemplary embodiment. As shown in FIG. 16, the user interface 1600 is configured to illustrate each job and a corresponding time line for each job including job receiving time, a pre-press time, and corresponding assignment of the job to one or more of the plurality of printers (i.e., Printer 1, Printer 2, Printer 3, Printer 4, Printer 5, Printer 6).

FIG. 17 is an illustration of a table 1700 of an incoming print job with an urgent or priority print job. As shown in FIG. 17, the incoming print jobs and corresponding data can include, for example, job name, product type, priority, color, page count, copies (for example, number of copies), finishing, cluster, and a job received time. In accordance with an exemplary embodiment, the product type can include, for example, brochure, book, manual, DM (direct mail), business cards (i.e., Biz Card), statement, book, and/or collateral. The priority can be normal or urgent (Job 18, for example, brochure, priority: Urgent; color: Color; page count: 30; copies: 100; finishing: Folding; Cluster: No; and Job Received Time: 7:30). The color can be black and white (i.e., B&W) or color. The page count can be for example, 50, 100, 150, 200, 300, and 400. The number of copies can be, for example, between 1 and 1000. The finishing can be stitching, none, punching, and/or folding. The clustering can be No or Yes. The time received can be stored as a time and date.

Figure 18:
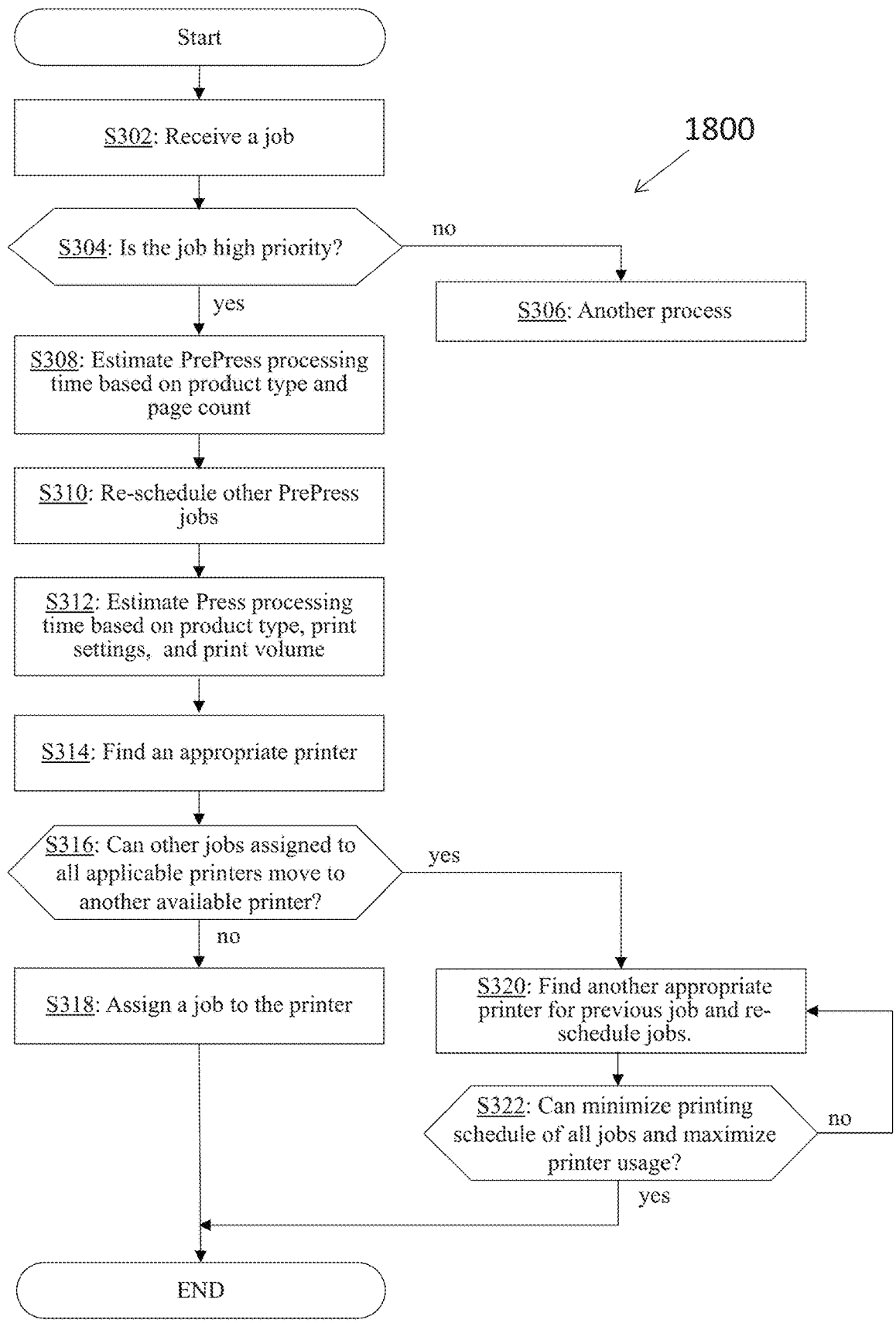
FIG. 18 is an illustration of a flow chart of an incoming print with an urgent or priority print job in accordance with an exemplary embodiment.

FIG. 18 is an illustration of a flow chart 1800 of an incoming print with an urgent or priority print job in accordance with an exemplary embodiment. As shown in FIG. 18, in step S302, the dashboard server program 221 receives a new job. In step S304, the dashboard manager 710 determines if the new job is a high priority job (i.e., Urgent). If the new job is not a high priority job, i.e., the new job is not urgent, the process continues to step S306, wherein the new job can be executed, for example, as disclosed in FIG. 13.

Alternatively, as shown in FIG. 18, if in step S304, it is determined that the new job is a high priority job, the process continues to step S308, where the dashboard manager 710 estimates Pre-processing processing time based on product type and page count. In step S310, the dashboard manager 710 reschedules other Pre-processing jobs. In step S312, the dashboard manager estimates press processing time based on product type, print settings, and print volume for the new job. In step S314, the dashboard manager 710 determines (i.e., finds) an appropriate printer 30*a*, 30*b* for the new job. In step S316, the dashboard manager 710 determines if another job (i.e., previously assigned job) assigned to all applicable printers can be moved to another available printer 30*a*, 30*b*. If the previous job cannot be moved to another available printer 30*a*, 30*b*, in step S318, the new job is assigned to the printer 30*a*, 30*b*. If the previously assigned job being assigned to a specific printer of the plurality of printers can be assigned to another printer, in step S320, another appropriate printer is found for the previous job and the previous jobs are rescheduled. In step S322, a determination is made if the rescheduling and/or reassigning of the previous job to another printer can minimize printing schedule of all jobs (i.e., all previous jobs and the new job) and maximize printer usage. If the rescheduling and/or reassigning of the previous job to the another printer does not minimize the printing schedule of all jobs and maximize printer usage, the process returns to step S320 to determine if another printer is available for the previous job and re-scheduling of the jobs can be performed to minimize the printing schedule of all jobs and maximize printer usage. In step S322, if the re-scheduling of the jobs can minimize the printing schedule of all jobs and maximize printer usage, the jobs are assigned and/or reassigned in accordance with the determination in step S320.

Figure 19:
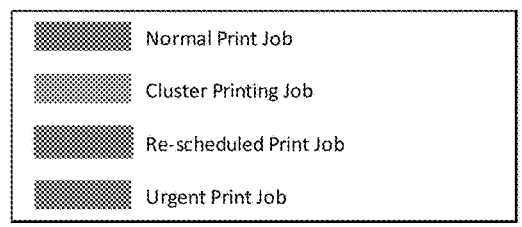
FIG. 19 is an illustration of an exemplary user interface of job scheduling per printer with an urgent or priority print job.

FIG. 19 is an illustration of an exemplary user interface 1900 of job scheduling per printer with an urgent or priority print job. As shown in FIG. 19, the user interface 1900 is configured to illustrate each printer, i.e., Printer 1, Printer 2, Printer 3, . . . , the type or capabilities of each printer, for example, Black & White or Color, and finishing options, for example, Stitching, Punching, and/or Folding. Upon receipt of a print job, the print job is place in a queue for printing and the corresponding time period in which the print job is scheduled to be printed is displayed. The print jobs as shown in FIG. 19 can include normal print jobs (Jobs 1, 2, 3, 4, 5, 6, 8, 9, 10, 11, 13, 14, and 17), cluster printing jobs (Jobs 7 and 16), re-scheduled print job (Jobs 12 and 15), and urgent print jobs (Job 18).

Figure 20:
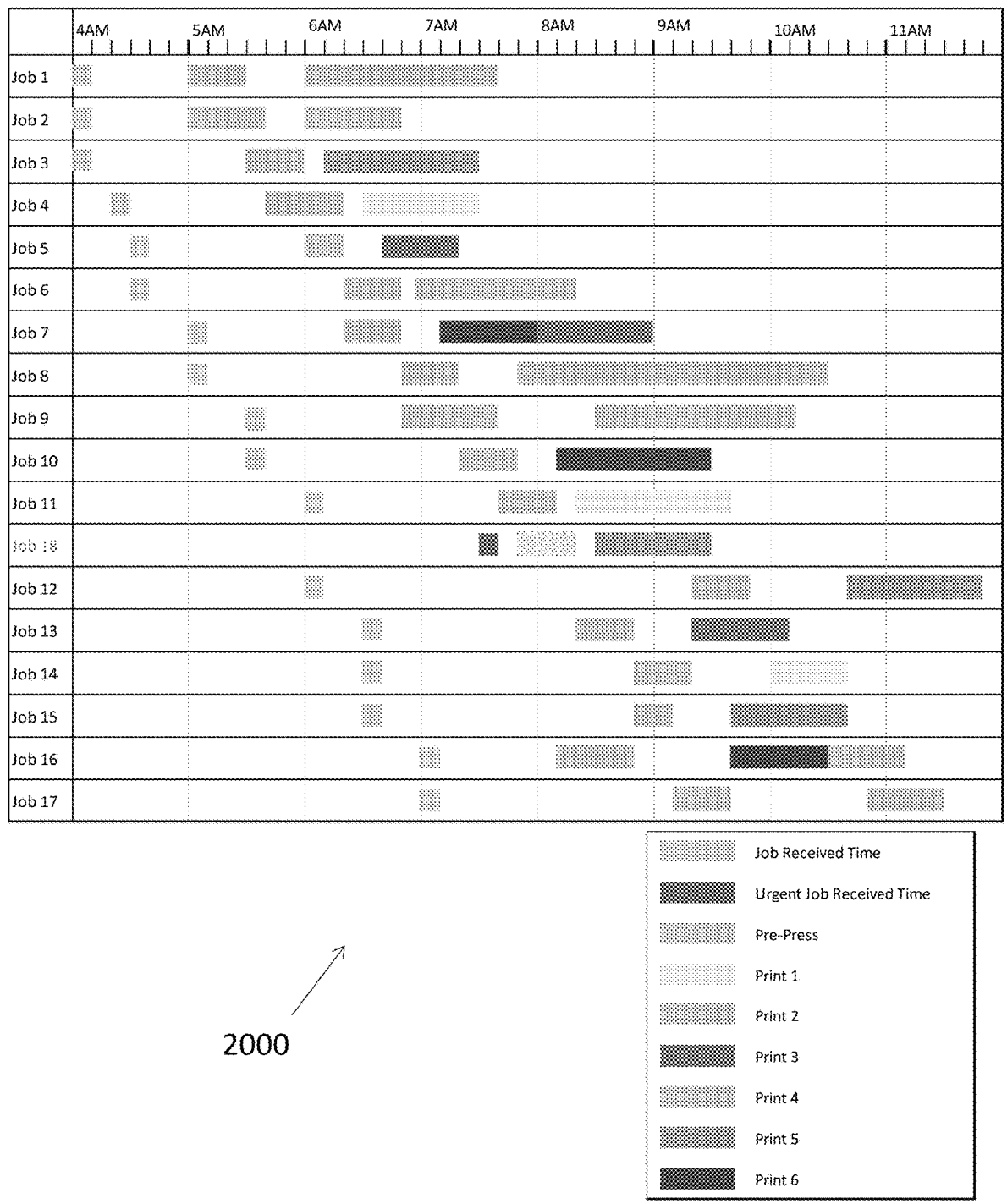
FIG. 20 is an illustration of an exemplary user interface of job scheduling with an urgent or priority print job.

FIG. 20 is an illustration of an exemplary user interface (or job scheduling screen) 2000 of job scheduling with an urgent or priority print job. As shown in FIG. 20, the user interface 2000 is configured to illustrate each job and a corresponding time line for each job including job receiving time, an urgent job received time, a pre-press time, and corresponding assignment of the job to one or more of the plurality of printers (i.e., Printer 1, Printer 2, Printer 3, Printer 4, Printer 5, Printer 6).

Figure 21:
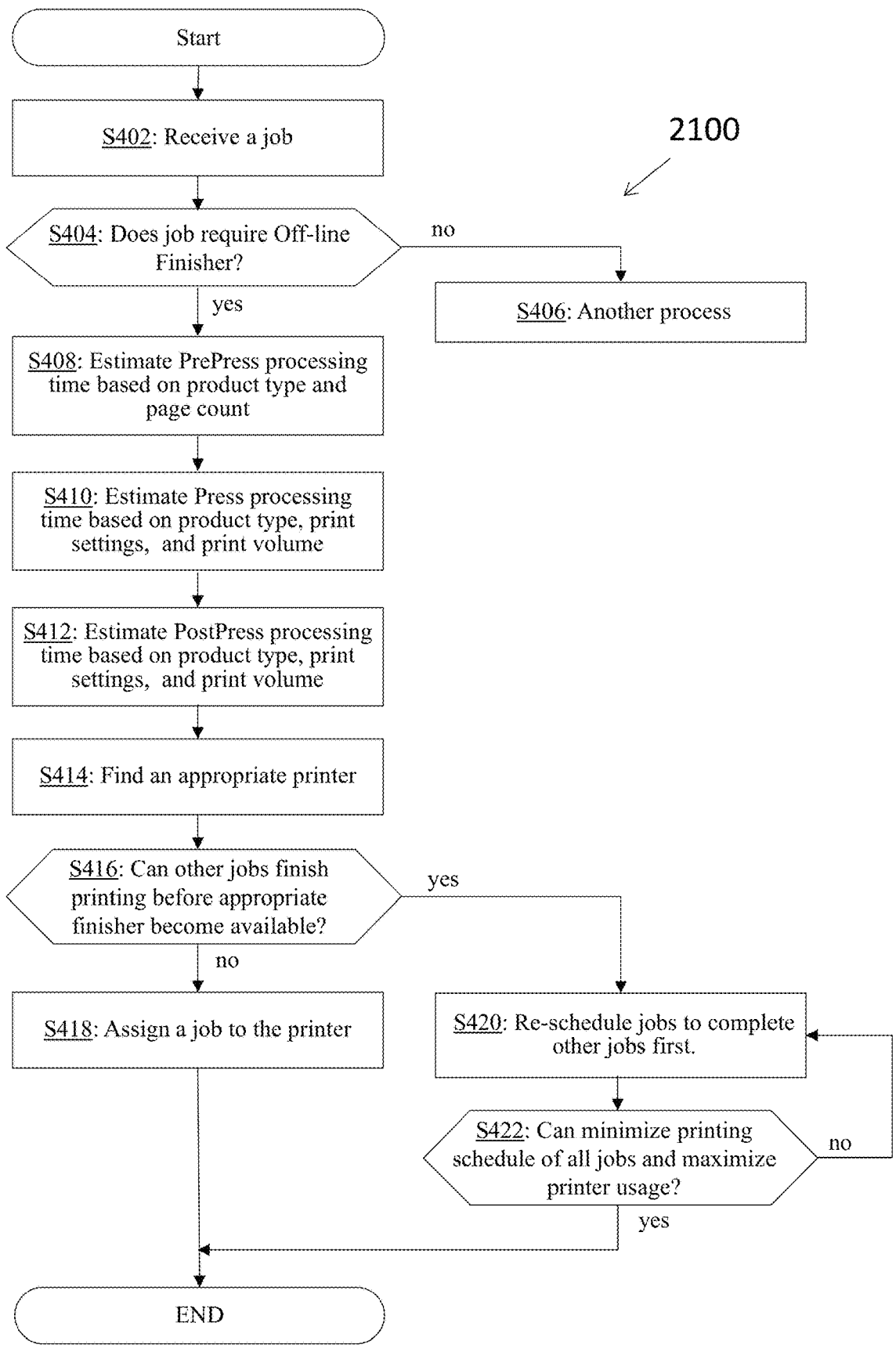
FIG. 21 is an illustration of a flow chart for rescheduling a print job or print jobs with post-processing dependence in accordance with an exemplary embodiment.

FIG. 21 is an illustration of a flow chart 2100 for rescheduling a print job or print jobs with post-processing dependence in accordance with an exemplary embodiment. As shown in FIG. 21, in step S402, the dashboard server program 221 receives a new job. In step S404, the dashboard manager 710 determines if the new job requires an off-line finisher 40*a*, 40*b*. In accordance with an exemplary embodiment, an off-line finisher can be any finishing device, for example, a stapler, a collator, a hole puncher, a folding assembly, and a finisher paper conveyor, which is not connected or a part of a printer 30*a*, 30*b*. If the new job does not require an off-line finisher, the process continues to step S406, wherein the new job can be executed, for example, as disclosed in FIG. 13.

Alternatively, as shown in FIG. 21, if in step S404, it is determined that the new job requires an off-line finisher, the process continues to step S408, where the dashboard manager 710 estimates Pre-processing processing time based on product type and page count for the new job. In step S410, the dashboard manager 710 estimates press processing time based on product type, print settings, and print volume for the new job. In step S412, the dashboard manager estimates post-press processing time based on product type, print settings, and print volume for the new job. In step S414, the dashboard manager 710 determines (i.e., finds) an appropriate printer 30*a*, 30*b* for the new job. In step S416, the dashboard manager 710 determines if another job will finish printing before the appropriate finisher becomes available. If another job will not finish printing before the appropriate finisher becomes available, the new job is assigned to printer 30*a*, 30*b*, in step S418, the job is assigned to the printer 30*a*, 30*b*. If another job (i.e., previously assigned job, the previously assigned job being assigned to a specific printer of the plurality of printers) can finish printing before the appropriate finisher becomes available, in step S420, the dashboard manager 710 reschedules jobs to complete (i.e., print) other jobs first. In step S422, a determination is made if the rescheduling and/or reassigning of another job to another printer can minimize printing schedule of all jobs and maximize printer usage. If the rescheduling and/or reassigning of the another job to the another printer does not minimize the printing schedule of all jobs and maximize printer usage, the process returns to step S420 to determine if another printer is available for the previous job and re-scheduling of the jobs can be performed to minimize the printing schedule of all jobs and maximize printer usage. In step S422, if the re-scheduling of the jobs can minimize the printing schedule of all jobs and maximize printer usage, the previous jobs are assigned and/or reassigned in accordance with the determination in step S420.

Figure 22:
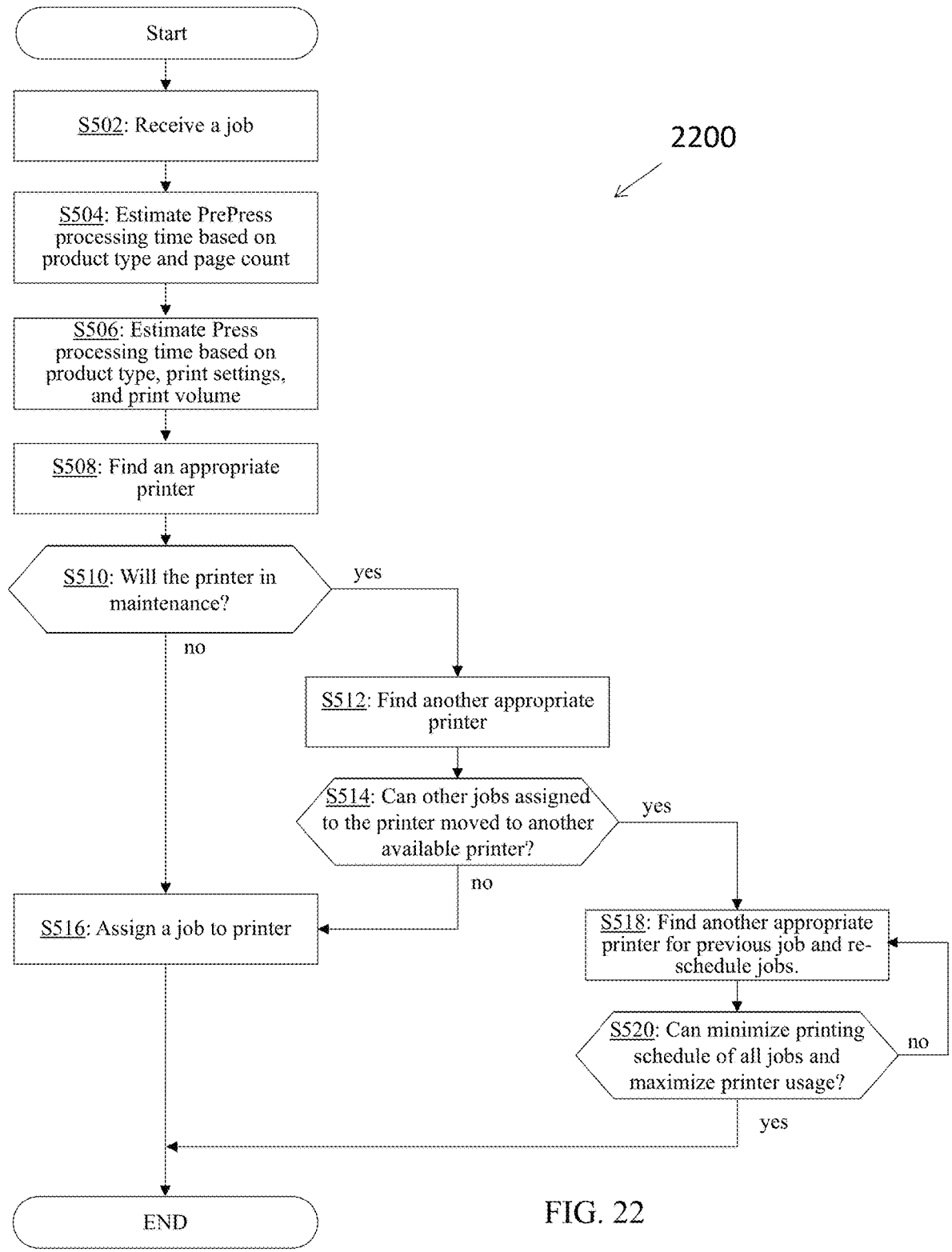
FIG. 22 is an illustration of a flow chart for printer maintenance in accordance with an exemplary embodiment.

FIG. 22 is an illustration of a flow chart 2200 for printer maintenance in accordance with an exemplary embodiment. As shown in FIG. 22, in step S502, the dashboard server program 221 receives a new job. In step S504, the dashboard manager 710 estimates Pre-processing processing time based on product type and page count for the new job. In step S506, the dashboard manager 710 estimates press processing time based on product type, print settings, and print volume for the new job. In step S508, the dashboard manager 710 determines (i.e., finds) an appropriate printer 30a, 30b for the new job. In step S510, the dashboard manager 710 determines if the assigned printer 30a, 30b, will be in maintenance (i.e., is the printer schedule for maintenance during the print time). In accordance with an exemplary embodiment, maintenance can include replacing or cleaning parts, color calibration, adding toner, machine failure, machine error status, for example, out of paper or print media, or loading of paper or print media. If the assigned printer 30a, 30b, will not be in maintenance during the scheduled print time, in step S516, the new job is assigned to the printer 30a, 30b, for processing. If the printer 30a, 30b is scheduled for maintenance during the scheduled print time, the process continues to step S512, in which another appropriate printer is found for the new job. In step S514, the dashboard manager 710 determines if other jobs can be assigned to the printer be moved to another available printer. In step S514, if another job cannot be moved to another available printer 30a, 30b, the new job is assigned to the printer 30a, 30b. If another job (i.e., previously assigned job, the previously assigned job being assigned to a specific printer of the plurality of printers) can be assigned to another printer, in step S518, another appropriate printer is found for the another job and the jobs are rescheduled. In step S520, a determination is made if the rescheduling and/or reassigning of the another job to the another printer can minimize printing schedule of all jobs and maximize printer usage. If the rescheduling and/or reassigning of the another job to the another printer does not minimize the printing schedule of all jobs and maximize printer usage, the process returns to step S518 to determine if another printer is available for the previous job and re-scheduling of the jobs can be performed to minimize the printing schedule of all jobs and maximize printer usage. In step S520, if the re-scheduling of the jobs can minimize the printing schedule of all jobs and maximize printer usage, the jobs are assigned and/or reassigned in accordance with the determination in step S518.

Figure 23:
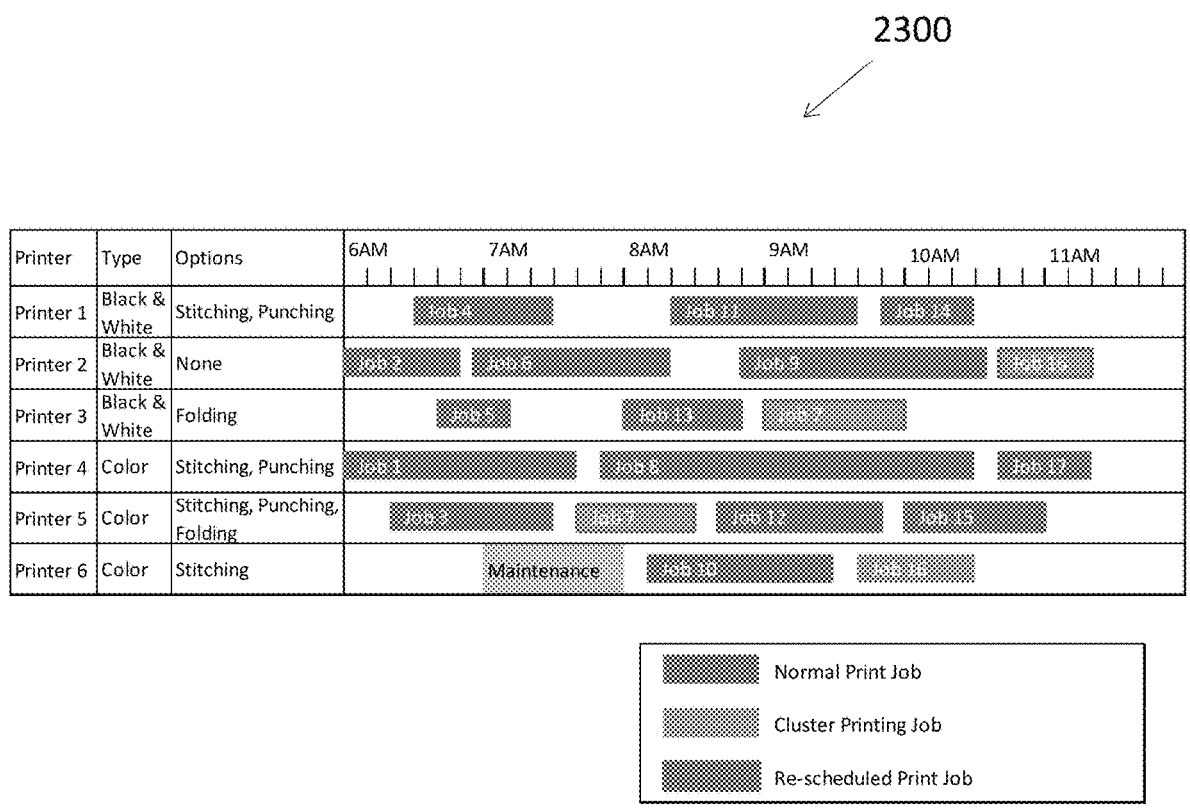
FIG. 23 is an illustration of an exemplary user interface of job scheduling per printer with printer maintenance in accordance with an exemplary embodiment.

FIG. 23 is an illustration of an exemplary user interface (or job scheduling screen) 2300 of job scheduling per printer with printer maintenance in accordance with an exemplary embodiment. As shown in FIG. 23, the user interface 2300 is configured to illustrate each printer, i.e., Printer 1, Printer 2, Printer 3, . . . , the type or capabilities of each printer, for example, Black & White or Color, and finishing options, for example, Stitching, Punching, and/or Folding. Upon receipt of a print job, the print job is place in a queue for printing and the corresponding time period in which the print job is scheduled to be printed is displayed. The print jobs as shown in FIG. 23 can include normal print jobs (Jobs 1, 2, 3, 4, 5, 6, 8, 10, 11, 14, and 17), cluster printing jobs (Jobs 7 and 16), re-scheduled print job (Jobs 7, 9, 12, 13, and 15), and maintenance (Printer 6, for example, between 7 am and 8 am).

Figure 24:
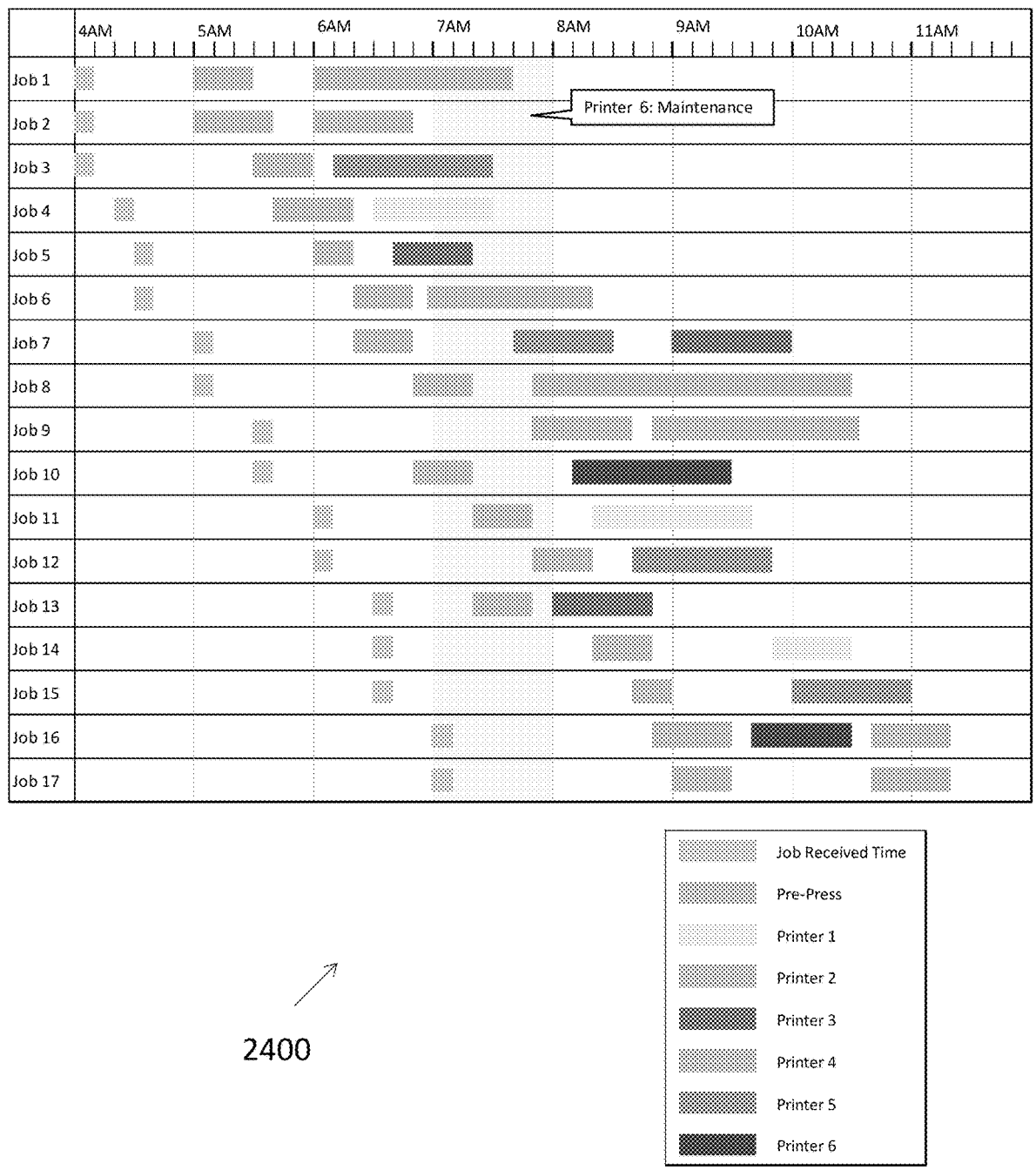
FIG. 24 is an illustration of an exemplary user interface of job scheduling per print job with printer maintenance in accordance with an exemplary embodiment.

FIG. 24 is an illustration of an exemplary user interface (or job scheduling screen) 2400 of job scheduling per print job with printer maintenance in accordance with an exemplary embodiment. As shown in FIG. 24, the user interface 2400 is configured to illustrate each job and a corresponding time line for each job including job receiving time, a pre-press time, and corresponding assignment of the job to one or more of the plurality of printers (i.e., Printer 1, Printer 2, Printer 3, Printer 4, Printer 5, Printer 6) including maintenance on Printer 6.

Figure 25:
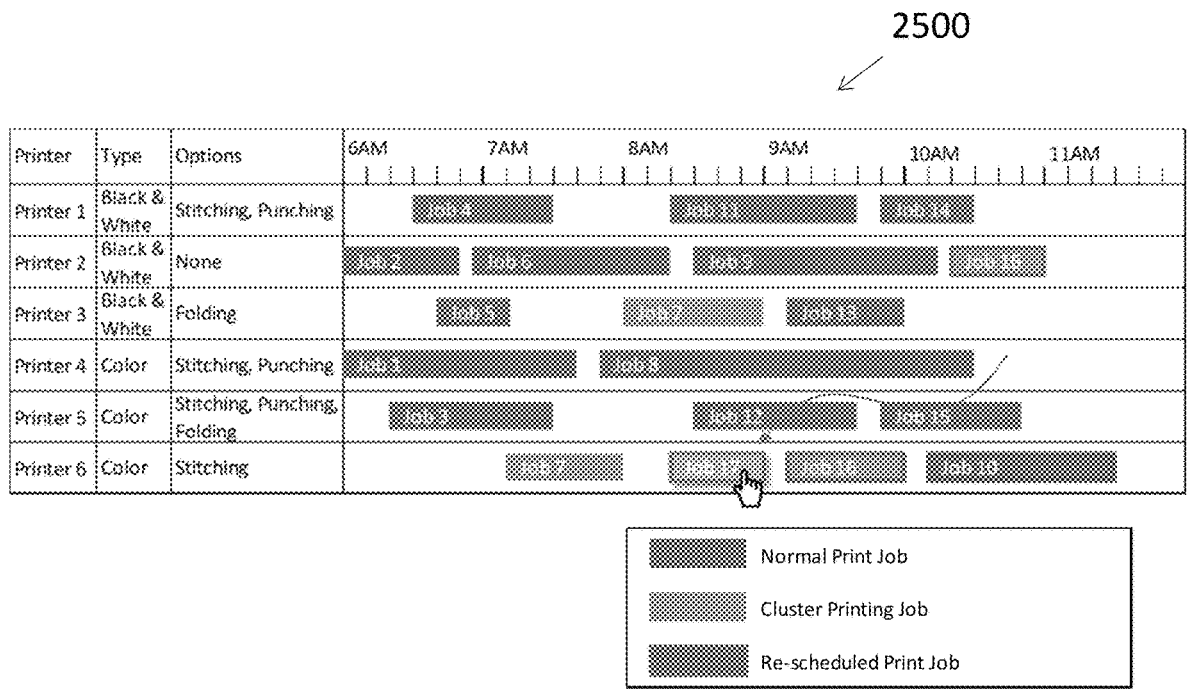
FIG. 25 is an illustration of an exemplary user interface of job scheduling per printer with manual rescheduling in accordance with an exemplary embodiment.

FIG. 25 is an illustration of an exemplary user interface (or job scheduling screen) 2500 of job scheduling per printer with manual rescheduling in accordance with an exemplary embodiment. As shown in FIG. 25, the user interface 2300 is configured to illustrate each printer, i.e., Printer 1, Printer 2, Printer 3, . . . , the type or capabilities of each printer, for example, Black & White or Color, and finishing options, for example, Stitching, Punching, and/or Folding. Upon receipt of a print job, the print job is place in a queue for printing and the corresponding time period in which the print job is scheduled to be printed is displayed. The print jobs as shown in FIG. 25 can include normal print jobs (Jobs 1, 2, 3, 4, 5, 6, 8, 9, 10, 11, 13, 14, and 15), cluster printing jobs (Jobs 7 and 16), re-scheduled print job (Jobs 10 and 16), and manual re-scheduled print job (Job 17).

Figure 26:
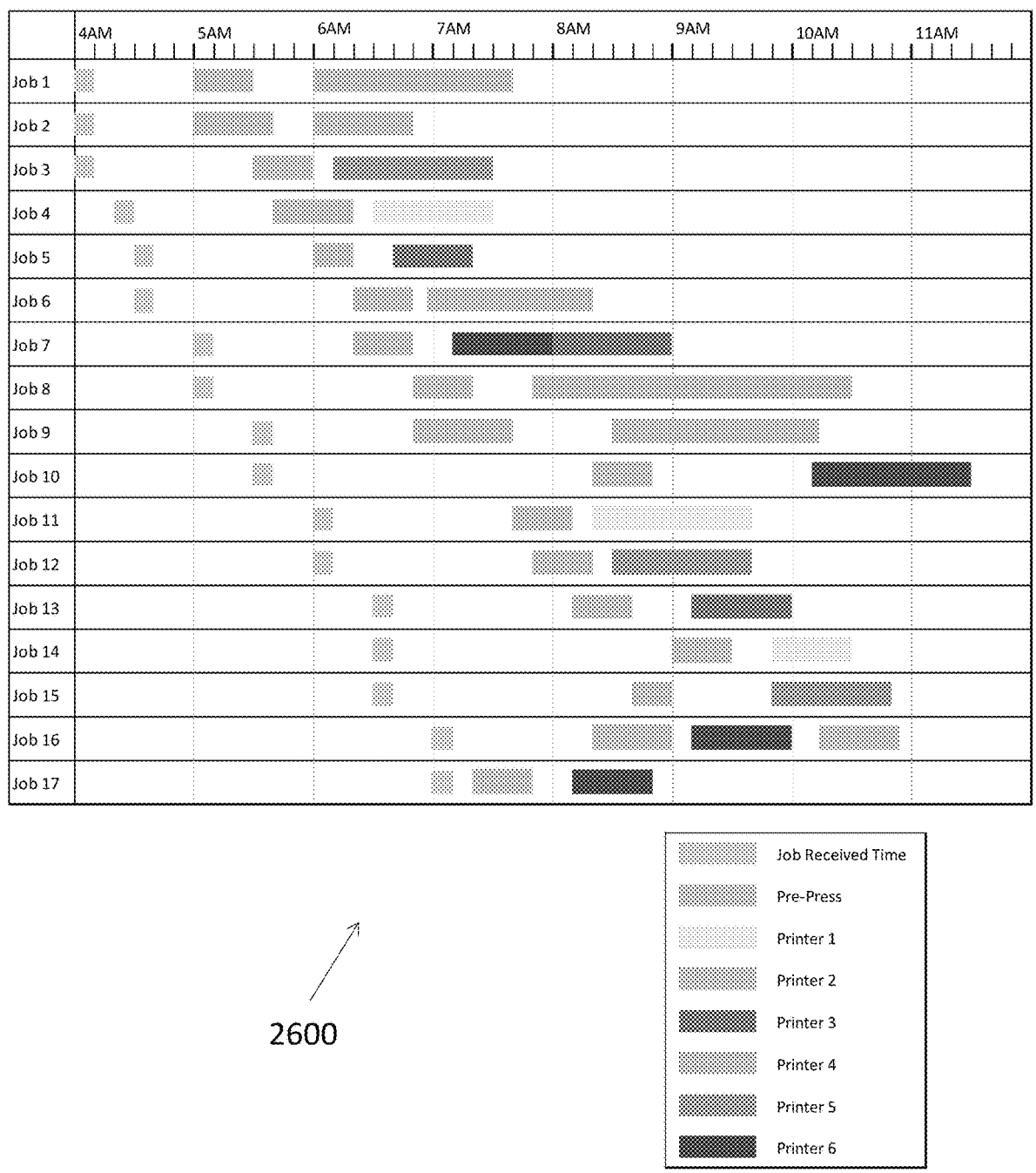
FIG. 26 is an illustration of an exemplary user interface of job scheduling per print job with manual rescheduling in accordance with an exemplary embodiment.

FIG. 26 is an illustration of an exemplary user interface (or job scheduling screen) 2600 of job scheduling per print job with manual rescheduling in accordance with an exemplary embodiment. As shown in FIG. 26, the user interface 2600 is configured to illustrate each job and a corresponding time line for each job including job receiving time, a pre-press time, and corresponding assignment of the job to one or more of the plurality of printers (i.e., Printer 1, Printer 2, Printer 3, Printer 4, Printer 5, Printer 6) including a manual re-scheduled print job as shown in FIG. 25.

Figure 27:
FIG. 27 is an illustration of a table showing a future job list in accordance with an exemplary embodiment.

FIG. 27 is an illustration of a table 2700 showing a future job list in accordance with another exemplary embodiment. As shown in FIG. 27, the future job list can include, for example, a Job 1 and Job 2 in which a success rate is calculated, for example, by the analytics engine 720 of the dashboard manager 710 as disclosed herein. In accordance with an exemplary embodiment, the success rate is a percentage (or alternatively, a fraction) of success among a number of attempts to successfully print a print job on a printer 30a, 30b. For example, as disclosed, machine failure can occur during printing of a print job and based on the job information for the print job. For example, job information for Job 1 and Job 2 can include that Job 1 is a black and white print job of 100 pages on A4 paper (or print media) with an 11:00 am deadline, and Job 2 is a color print job of 50 pages on 8×9 sized paper with a 10:00 am deadline.

Figure 28:
FIG. 28 is an illustration of a table showing the future job list of FIG. 27 and predicted success rates for a plurality of printers using a machine learning service.

FIG. 28 is an illustration of a table 2800 showing the future job list of FIG. 27 and predicted success rates for a plurality of printers using a machine learning service. As shown in FIG. 28, each of the input of Job 1 and Job 2 can be used as input data to a machine learning service which can then predict the success rates, for example, in percentage (%) for each of the one or more printers 30a, 30b, for example, available in a print shop 70. In accordance with an exemplary embodiment, the available printers 30a, 30b, can include, for example, Printer A, Printer B, Printer C, and Printer D, and wherein each of the printers 30a, 30b is a color printer. In accordance with an exemplary embodiment, the predetermined rate or threshold success rate, can be, for example, 99.9% or greater, 99.7% or greater, 99.5% or greater, 99% or greater, 98.5% or greater, 98% or greater, 97.5% or greater, 97% or greater, etc.

In addition, in accordance with an exemplary embodiment, a predetermined success rate or threshold can be set, for example, for assigning a print job (i.e., Job) to a printer 30a, 30b. For example, if the predicted success rate for a certain type of job is less than, for example, 97%, it would be preferable, that the print job is not assigned to a printer 30a, 30b, having a predicted success rate that is less than, for example, the predetermined rate or threshold (i.e., 97%). For example as shown in FIG. 28, Job 1 would not be assigned to Printer D, and Job 2 would not be assigned to Printer C or D. In accordance with an embodiment, it may be appropriate to assign a print job to printer 30a, 30b, with a success rate below the predetermined rate or threshold, if necessary, for example, as described herein.

As shown in FIG. 28, it can be noted that the predicted success rates for Job 1 with Printer A, Printer B, and Printer C are above the threshold, and Job 1 is preferably sent to Printer A, Printer B, or Printer C depending on availability. For example, for Job 1, three (3) of the four (4) printers, Printer A, Printer B, and Printer C have a predicted success rate above the threshold, And one (1) printer, Printer D, which is below a threshold success rate (97%) of 96.9%. Thus, Job 1 can be sent to Printer A, Printer B, or Printer C depending on their availability. In accordance with a first priority being Printer A, which has the highest success rate. If Printer A is busy, for example, for the next 10 hours then Job 1 can be sent to Printer B. If Printer B is busy for next 5 hours, the scheduler can check for availability on Printer C, and if Printer C is busy, for example, for the next 2 hours, it may be preferable to send Job 1 to Printer C since Job 1 will be completed sooner than if Job 1 was sent to Printer A (10 hour delay) or Printer B (5 hour delay).

Figure 29:
FIG. 29 is an illustration of a table showing a job list in accordance with an exemplary embodiment.

FIG. 29 is an illustration of a table 2900 showing a job list in accordance with an exemplary embodiment. As shown in FIG. 29, for example, new jobs (i.e., Job 5, Job 11) are received, for example, by the server 10a, 10b, for printing. The jobs can include, for example, a color print job of 100 pages, A4, and an 11:00 am deadline (Job 5), and a color print job of 120 pages, 8×9, and a 10:00 am deadline (Job 11).

Figure 30:
FIG. 30 is an illustration of a table showing a use case for the job list in FIG. 29 in accordance with an exemplary embodiment.

FIG. 30 is an illustration of a table 3000 showing a use case for the job list in FIG. 29 in accordance with an exemplary embodiment. As shown in FIG. 30, upon receipt of Jobs 5 and 11, the server 10a, 10b, using a machine learning service or algorithm hosted on the server 10a, 10b, and/or dashboard manager 710 and analytic engine 720 can input data corresponding to each of the received print jobs (Job 5 and Job 11), and which can estimate a predicted success rate of the type of job being printed successfully with one or more printers 30a, 30b, within, for example, a print shop 70. The predicted success rate can be based on job information, which can include, for example, a product type, job ticket settings, and a page count. In accordance with an exemplary embodiment, the product type and job ticket setting can include the type of print job (i.e., black and white, color, etc.), the type and/or size of print media, and other variables including the number of pages that can be input into the machine learning service about each of the one or more printers 30a, 30b, within the print shop 70, for example. The predicted success rate for Job 5 was 99.8% with Printer A and 96.3% with Printer B. For Job 11, the predicted success rate was 99.1% for Printer A, and 96.2% for Printer B. In accordance with an exemplary embodiment, if the threshold for assigning a job is, for example, 97%, in the present example, Job 5 and Job 11 would both be assigned to Printer A since the predicted success rate for Printer B for both Job 5 and Job 11 is less than 97% (i.e., 96.3% and 96.2, respectively).

Figure 31:
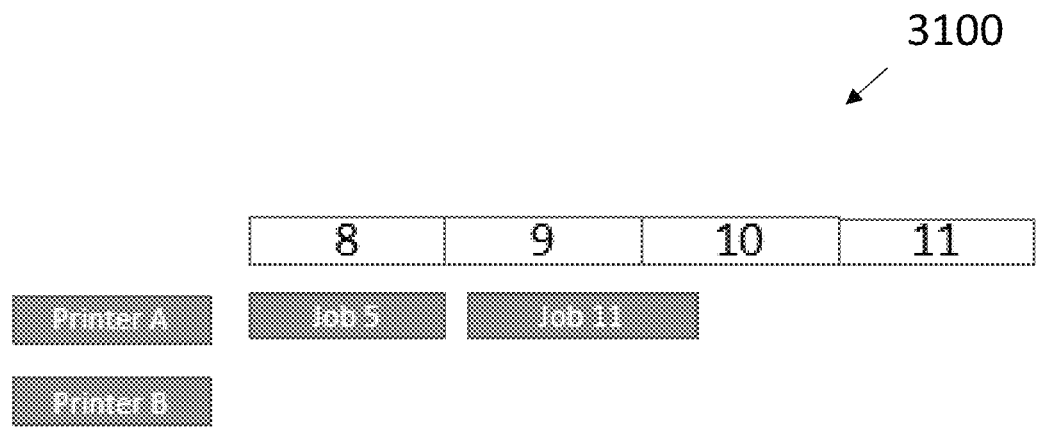
FIG. 31 is an illustration of a table showing another use for the job list in FIG. 29 in accordance with an exemplary embodiment.

FIG. 31 is an illustration of a job schedule for Jobs 5 and 11 as shown in FIG. 29 in accordance with an exemplary embodiment. As shown in FIG. 31, if both jobs (Job 5 and Job 11) are to be assigned to Printer A since the predicted success rate of Printer B is below the desired threshold, the jobs can be scheduled based on printer availability, and if needed, one or more jobs may be rescheduled to meet, for example, a time deadline. For example, if Job 5 was received first, it can be scheduled for Printer A, for example, at 8:00 am, for a print time of approximately 1 hour, and if Job 11 is received after Job 5, it may be scheduled for printing, at 9:00 am, with a print time of approximately 1 hour and 20 minutes. However, as shown in FIGS. 29 and 30, Job 11 has a time deadline of 10:00 am. Accordingly, it would be desirable to reschedule Job 11 to meet the time deadline of 10:00 am by printing Job 11 first and then Job 5.

Figure 32:
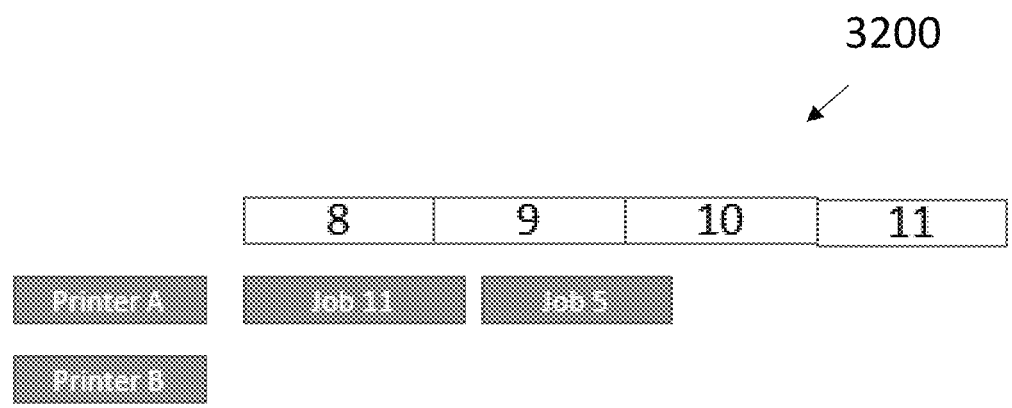
FIG. 32 is an illustration of a table showing rescheduling of the jobs in the job list in FIGS. 30 and 31 in accordance with an exemplary embodiment.

FIG. 32 is an illustration of a job schedule showing rescheduling of Jobs 5 and 1 in accordance with an exemplary embodiment. As shown in FIG. 32, the start times for Job 5 and Job 11 can be rescheduled such that Job 11 is printed first, i.e., start time of 8:00 am and will finish at around 9:20 am, before the 10:00 am deadline. In addition, Job 5 can have a start time of 9:20 am, and will finish printing before the 11:00 am deadline for Job 5.

FIG. 33 is an illustration of a table showing a job list in accordance with another embodiment. As shown in FIG. 33, a plurality of jobs, i.e., Job 5, Job 11, Job 12, and Job 13 may be received by the server 10a, 10b, and/or dashboard manager 710 for processing and printing. In accordance with an exemplary embodiment, each of the Jobs (Job 5, Job 11, Job 12, and Job 13) can include input parameters including type of print job (i.e., black and white, color, etc.), page count, page size, and deadline for completion.

FIG. 34 is an illustration of table 3400 showing the job list as shown in FIG. 33 with a prediction result in accordance with an embodiment. As shown in FIG. 34, the scheduler, for example, server 10a, 10b, and/or dashboard manager 710 upon receipt of the plurality of jobs (i.e., Jobs 5, 11, 12, and 13) and 11, using a machine learning service or algorithm hosted on the server 10a, 10b, and/or dashboard manager 710 and analytic processor 620 can input data corresponding to each of the received print jobs (Jobs 5, 11, 12, and 13), and which can estimate a predicted success rate of the type of job being printed successfully with one or more printers 30a, 30b (i.e., Printer A, Printer B, etc.) within, for example, a print shop 70. As shown, for example, each of the printers (i.e., Printer A, Printer B, Printer C, and Printer D) will have a corresponding predicted (or estimated) success rate for the Job based on the corresponding input or print parameters.

Figure 35:
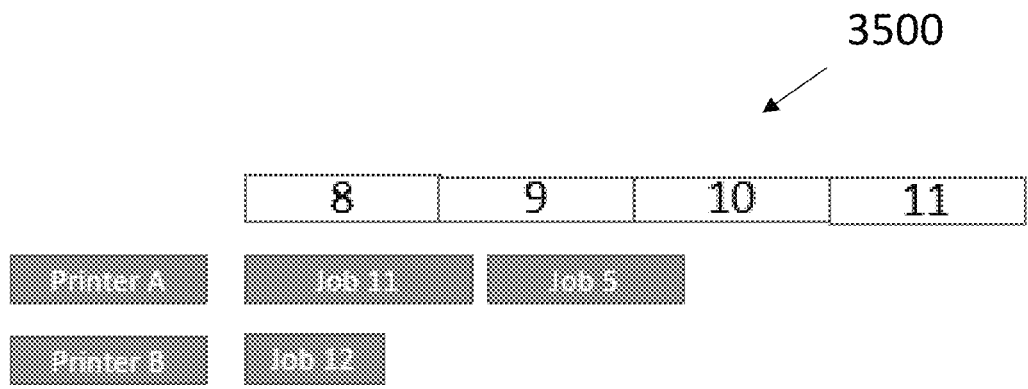
FIG. 35 is an illustration of a job schedule in accordance with an embodiment.

FIG. 35 is an illustration of a job schedule 3500 before a job is received in accordance with an embodiment. As shown in FIG. 35, before Job 13 has been received, since Job 11 has a deadline of 10:00 am and Job 5 has a deadline of 11:00 am as shown in FIG. 32, Job 11 is scheduled to be printed first. In addition, Job 12 can be assigned to Printer B since the predicted success rate for Job 12 on Printer B is 99.3% and Printer A is 98.5%. Thus, since the predicted success rate for Job 12 is higher on Printer B than Printer A, Printer B is selected to print Job 12.

Figure 36:
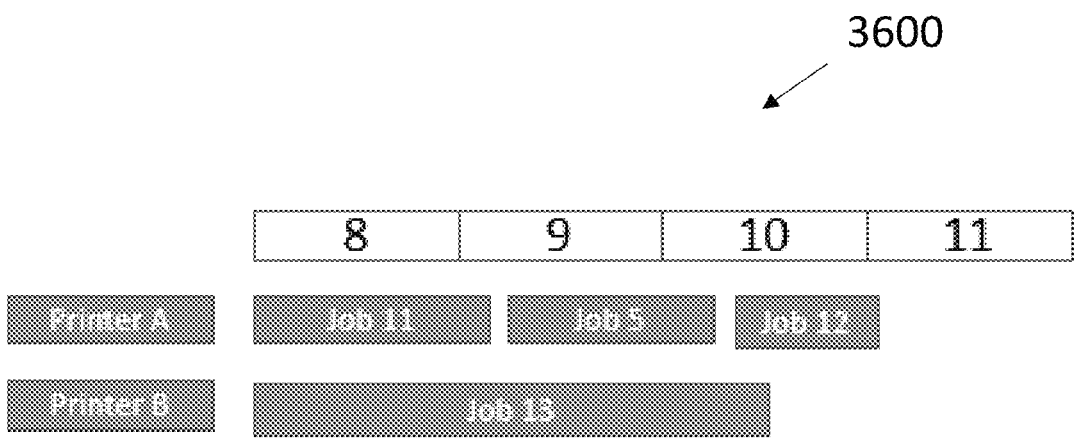
FIG. 36 is an illustration of a job schedule for the job list in FIG. 35 after a new job is added in accordance with an exemplary embodiment.

FIG. 36 is an illustration of a job schedule for the job list in FIG. 35 after a new job is added in accordance with an exemplary embodiment. As shown in FIG. 36, after Job 13 is received by the dashboard manager 710, Job 12 is rescheduled to Printer A since Job 12 is a color job that has an 11:00 am deadline with a projected print time of approximately 2.5 hours. The predicted success rate for Job 13 for both Printer A (98.9%) and Printer B (98.5%) exceed the desired threshold, for example, of 97%, Job 13 can be assigned to either Printer A or Printer B. However, since the predicted success rate for Printer B for Jobs 5 and 11 are less than the desired threshold, it may be preferable to reschedule Job 12 having a deadline of 12 am to Printer A to accommodate Job 13 on Printer B.

Figure 37:
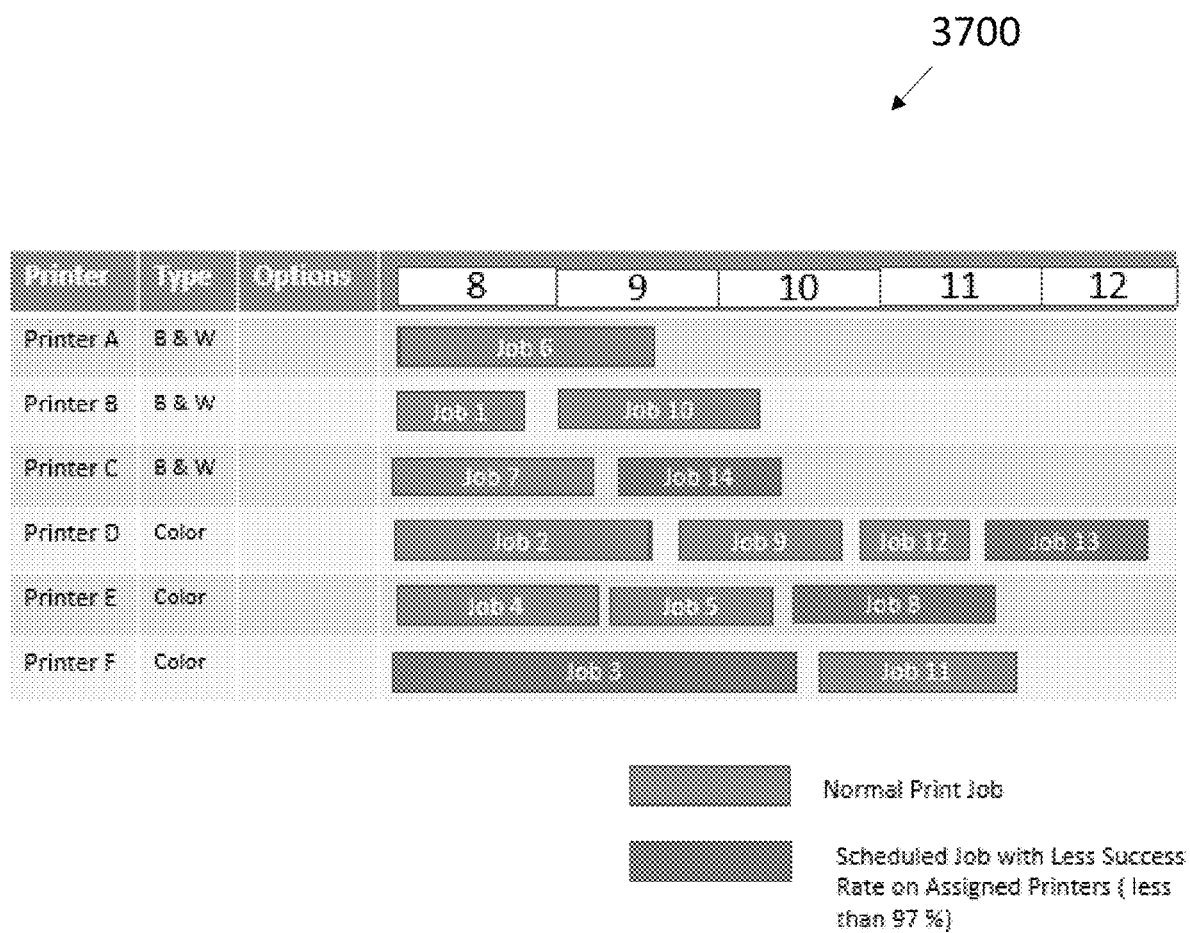
FIG. 37 is an illustration of a job schedule in accordance with an exemplary embodiment.

FIG. 37 is an illustration of a job schedule 3700 in accordance with an exemplary embodiment. As shown in FIG. 37, a random schedule of jobs on a plurality of printers (i.e., Printer A, Printer B, Printer C, Printer D, Printer E, Printer F), which has been scheduled based on deadlines, for example, deadlines for completion of the print jobs and does not consider predicted success rate for a job and a corresponding printer. For example, although each of the jobs (Jobs 1, 2, 3, 4, 5, 6, 7, 8, 9, 10, 11, 12, 13, and 14) will be completed within a desired deadline, one or more of the jobs have been assigned to a printer in which based on the type of print job, the printer has a success rate of less than the desired threshold, for example, of 97%. For example, Jobs 3, 8, 13, and 14 have each been assigned to a printer, Printer C, Printer D, Printer E, and Printer F, respectively, that has a success rate of less than 97% with the type of print job (or job) that has been assigned to the printer.

Figure 38:
FIG. 38 is an illustration of a job list with success rates in accordance with an exemplary embodiment.

FIGS. 38 and 39 are illustrations of a job list 3800, 3900 with success rates in accordance with an exemplary embodiment. As shown in FIGS. 38 and 39, upon receipt of each of the jobs, the server 10a, 10b, using a machine learning service or algorithm hosted on the server 10a, 10b, and/or dashboard manager 710 and analytic processor 620 can input data corresponding to each of the received print jobs (Jobs 1-14), and which can estimate a predicted success rate of the type of job being printed successfully with one or more printers 30a, 30b (Printers A-F), within, for example, a print shop 70. For example, some types of print jobs may be more successful on one printer than another printer. For example, Job 3, a black and white print job has a relatively high predicted success rate on Printer B. However, for Job 3, the predicted success rate on Printer F is only 96.3%, which is below, the desired threshold, for example, of 97%.

Figure 40:
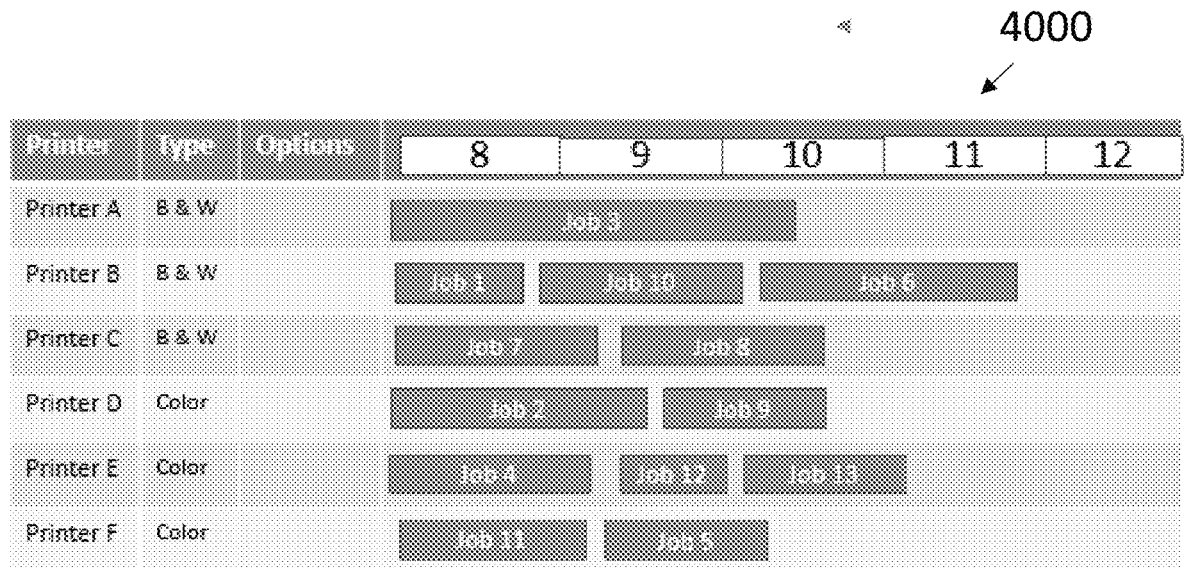
FIG. 40 is an illustration of job schedule before a job is received in accordance with an exemplary embodiment.

FIG. 40 is an illustration of job schedule before a job is received in accordance with an exemplary embodiment. As shown in FIG. 40, before the dashboard manager 710 and analytic process 620 receives Job 14, Jobs 1-13 are assigned to Printers A-F such that each job can be printed by the deadline, however, each job is assigned to a printer 30a, 30b, in which the predicted success rate for the job on the assigned printer 30a, 30b exceeds the desired threshold, for example, 97% in the present example.

Figure 41:
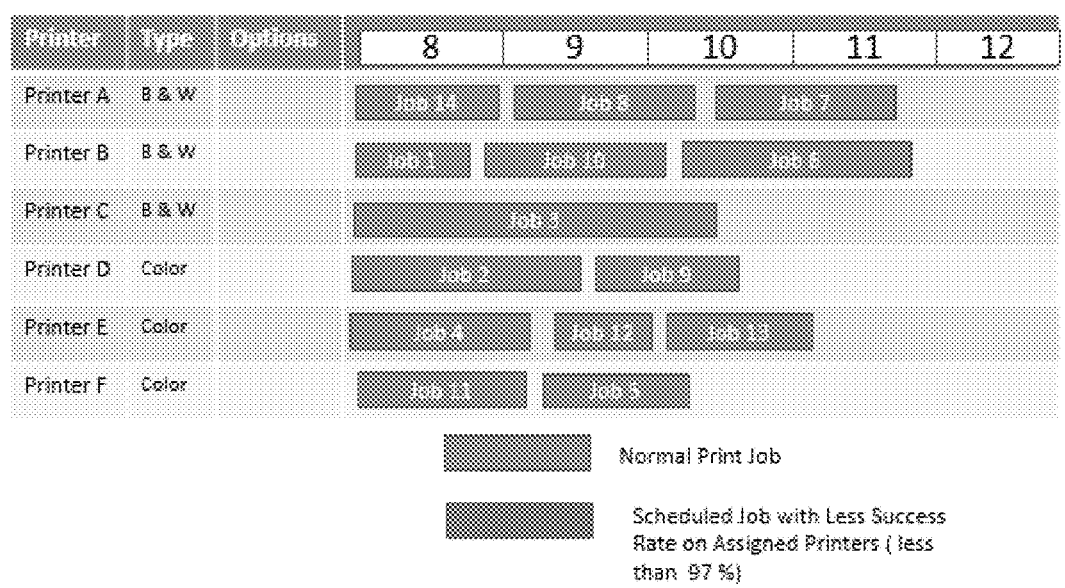
FIG. 41 is an illustration of the job schedule as shown in FIG. 40 after the job is received.

FIG. 41 is an illustration of the job schedule 4100 as shown in FIG. 40 after another job is received in accordance with an exemplary embodiment. As shown in FIG. 41, in order to meet the print deadline new Job 14, Job 3 originally scheduled for Printer A at 8:00 am is rescheduled to Printer C at 8:00 am, and Jobs 7 and 8 are reassigned to Printer A from Printer C and rescheduled at 10:30 am and 9:00 am, respectively, with Job 14 assigned to Printer A at 8:00 am. As shown in FIG. 39, the predicted success rates for Job 14 on only Printer D and Printer A exceeded the desired threshold, for example, of 97%.

Figure 42:
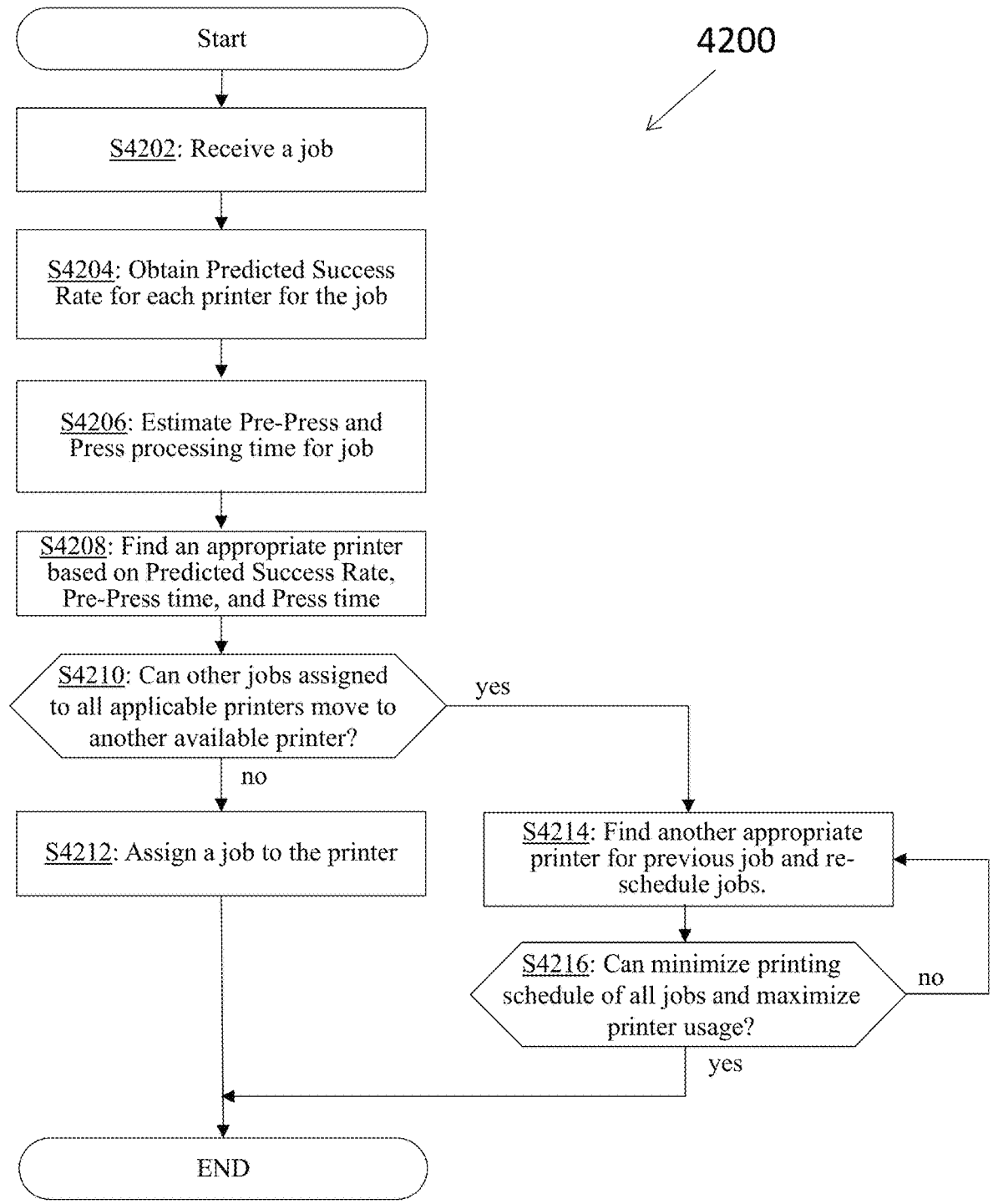
FIG. 42 is an illustration of a flow chart illustrating job scheduling with predicted success rates in accordance with an exemplary embodiment.

FIG. 42 is an illustration of a flow chart illustrating job scheduling with predicted success rates in accordance with an exemplary embodiment. FIG. 42 is an illustration of a flow chart 4200 illustrating job scheduling in accordance with an exemplary embodiment. As shown in FIG. 42, in step S4202, the dashboard server program 221 receives a new job. In step S4204, the analytics engine 720 of the dashboard manager 710 using, for example, a machine learning service, estimates the predicted success rate for the new job on each of the plurality of printers capable of printing the new job (i.e., a color print job requires a color printer not a black and white printer). In step S4206, the dashboard manage 710 estimates the Pre-processing processing time based on product type and page count for the new job, and press processing time based on product type, print settings, and print volume for the new jobs. In step S4208, the dashboard manager 710 determines (i.e., finds) an appropriate printer 30a, 30b (i.e., selected printer 30a, 30b) for the new job and temporarily assigns the new job to the printer 30a, 30b. As set forth herein, in step S4108, the appropriate printer 30a, 30b is a printer having a predicted success rate greater than a predetermined threshold value, for example, 97% or greater.

In step S4210, the dashboard manager 710 determines if the previous jobs waiting to be processed and assigned to one of the applicable printers (i.e., plurality of printers, for example, in the print shop) can be moved to another available printer 30a, 30b. If one of the previous jobs cannot be moved to another available printer 30a, 30b, the new job is assigned to the selected printer 30a, 30b, for example, in a first in, first out (FIFO) process. In accordance with an exemplary embodiment, upon assigning the new job to a printer 30a, 30b, the new job can be placed in a print queue, and the printer 30a, 30b, prints the jobs in the order received. If another job (i.e., one of the previously assigned jobs being assigned to a specific printer of the plurality of printers) can be assigned to another printer, in step S4214, another appropriate printer is found for the previous job and the other previous jobs are rescheduled.

In step S4216, a determination is made if the rescheduling and/or reassigning of the previous jobs to another printer can minimize printing schedule of all previous jobs and the new job to maximize printer usage. If the rescheduling and/or reassigning of the previous jobs to the another printer does not minimize the printing schedule of the jobs including the previous jobs and the new job to maximize printer usage, the process returns to step S4214 to determine if another printer is available for the previous job and re-scheduling of the previous jobs can be performed to minimize the printing schedule of all jobs and maximize printer usage. In step S4216, if the re-scheduling of the previous jobs can minimize the printing schedule of all jobs and maximize printer usage, the previous jobs are assigned and/or reassigned in accordance with the determination in step S4214.

In accordance with an exemplary embodiment, the assigning of the new print job to the at least one printer of the plurality of printers in step S4212 comprises temporarily assigning the new print job to the at least one printer of the plurality of printers only when none of the previous jobs can be reassigned or moved to another printer of the plurality printers.

In accordance with an exemplary embodiment, in step S4214, the determination if the one or more of the plurality of print jobs can be reassigned to another printer of the plurality of printers to minimize a print schedule for each of the plurality of print jobs can include attempting to re-assigning each of the one or more of the plurality of print jobs to another printer of the plurality of printers when the reassigning of the one or more of the plurality of print jobs minimizes the print schedule of the plurality of print jobs. In addition, the dashboard manager 710 can be configured to continue to the re-assigning of each of the one or more of the plurality of print jobs to another printer of the plurality of printers when the reassigning of the one or more of the plurality of print jobs minimizes the print schedule of the plurality of print jobs.

In accordance with an exemplary embodiment, the methods and processes as disclosed can be implemented on a non-transitory computer readable medium. The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for scheduling print jobs on a plurality of printers, the method comprising:
    collecting job information on each of a plurality of print jobs;
    obtaining a predicted success rate for each of the plurality of print jobs with each of the plurality of printers based on the job information on the each of the plurality of print jobs, the predicted success rate being a likelihood that a print job can be successfully completed by a printer; and
    assigning each of the plurality of print jobs to one or more printers of the plurality of printers with the predicted success rate for each of the one or more printers of the plurality of print jobs being greater than a predicted success threshold.

2. The method according to claim 1, wherein the obtained predicted success rate comprises:
    inputting the job information on the each of the plurality of print jobs into a machine learning service.

3. The method according to claim 1, wherein the job information on the each of the plurality print jobs includes a job received time, a product type, job ticket settings, and a page count.

4. The method according to claim 3, further comprising:
    receiving a new print job, the new job including job information;
    calculating a pre-processing time for the new print job;
    calculating a processing time for the new print job;
    determining at least one printer of the plurality of printers to execute the new print job;
    assigning the new print job to the at least one printer of the plurality of printers;
    determining if one or more of the plurality of print jobs assigned to the one or more of the plurality of printers can be reassigned to another printer of the plurality of printers to minimize a print schedule for each of the plurality of print jobs; and
    re-assigning the one or more of the plurality of print jobs to another printer of the plurality of printers when the reassigning of the one or more of the plurality of print jobs minimizes the print schedule of the plurality of print jobs.

5. The method according to claim 4, further comprising:
    splitting the new print job into two or more print jobs;
    calculating a pre-processing time for each of the two or more print jobs;
    calculating a processing time for each of the two or more print jobs;
    assigning each of the two or more print jobs to a printer of the plurality of printers;
    determining if one or more of the plurality of print jobs assigned to the one or more of the plurality of printers can be reassigned to another printer of the plurality of printers to minimize a print schedule for each of the plurality of print jobs based on each of the two or more print jobs being assigned to the printer of the plurality of printers; and
    re-assigning the one or more of the plurality of print jobs to another printer of the plurality of printers when the reassigning of the one or more of the plurality of print jobs minimizes the print schedule of the plurality of print jobs.

6. The method according to claim 4, wherein the new print job is a priority print job, the method comprises:
    executing the priority print job before one or more of the plurality of print jobs assigned to the printer of the plurality of printers in which the priority print job is assigned.

7. The method according to claim 4, wherein the new print job includes a print setting for an off-line finisher, the method comprising:
    determining if other print jobs finish printing before the off-line finisher becomes available;
    when the other print jobs cannot finish before the off-line finisher becomes available assigning the new print job to the off-line finisher; and
    when the other print jobs finish printing before the off-line finisher becomes available, rescheduling the one or more print jobs to complete other jobs first to minimize the print schedule of the plurality of print jobs.

8. The method according to claim 4, wherein the printer in which the new print job is assigned is scheduled for maintenance, the method comprising:
    determining another printer of the plurality of printers in which to assign the new print job; and
    determining if the one or more of the plurality of the plurality of print jobs assigned to the another printer of the plurality of printers can be moved to a further printer of the plurality of printers.

9. The method according to claim 4, further comprising:
    collecting a processing time per product type and a number of jobs in a queue for each of the plurality of printers;
    collecting a printer capability for each of the plurality of printers;
    collecting a status of each of the plurality of printers;
    collecting a maintenance schedule for each of the plurality of printers; and
    collecting a print duration for each of the plurality of jobs.

10. The method according to claim 4, wherein at least one of the plurality of printers includes one or more finishers, the method comprising:
    collecting post processing information for each of the plurality of print jobs, the post processing information including information on the one or more finishers;
    collecting a status of each of the plurality of printers;
    collecting a maintenance schedule for each of the plurality of printers; and
    collecting a print duration for each of the plurality of jobs.

11. The method according to claim 4, wherein the calculating of the pre-processing time for the new print job is based on a product type and a page count, the product type being a modification of the document and the page count being a number of pages or images to be printed, the method further comprising:

storing the product type and page count in a dashboard database.

12. The method according to claim 11, wherein the calculating of the processing time of the new print job comprising:
determining a number of printers in the plurality of printers;
determining a type of printer, a status of printer, and capability of a printer for each of the plurality of printers; and
determining a number of print jobs in each queue for each of the plurality of printers.

13. The method according to claim 4, wherein the assigning of the new print job to the at least one printer of the plurality of printers comprises:
temporarily assigning the new print job to the at least one printer of the plurality of printers only when none of the previous jobs can be reassigned or moved to another printer of the plurality printers.

14. The method according to claim 4, wherein the determination if the one or more of the plurality of print jobs can be reassigned to another printer of the plurality of printers to minimize a print schedule for each of the plurality of print jobs comprises:
attempting to re-assign each of the one or more of the plurality of print jobs to another printer of the plurality of printers when the reassigning of the one or more of the plurality of print jobs minimizes the print schedule of the plurality of print jobs.

15. The method according to claim 4, comprising:
continuing to the re-assigning of each of the one or more of the plurality of print jobs to another printer of the plurality of printers when the reassigning of the one or more of the plurality of print jobs minimizes the print schedule of the plurality of print jobs.

16. The method according to claim 4, further comprising:
executing the plurality of the plurality of print jobs on the plurality of printers; and
executing the new job on the at least one printer determined from the plurality of printers.

17. The method according to claim 4, further comprising:
displaying on a graphical user interface (GUI) a job schedule screen, the job schedule screen being a two dimensional chart in which a first axis indicated an execution length of time for each of the print jobs and the new print job, and in which a second axis shows each of the plurality of printers.

18. The method according to claim 4, further comprising:
storing the calculated pre-processing time and the calculating processing time for the new print job in a database;
storing an actual pre-processing time and an actual processing time for the new print job in the database; and
calculating a subsequent pre-processing time and a processing time for a subsequent print job by comparing the calculated pre-processing time and the calculated processing time to the actual pre-processing time and the actual processing time, respectively.

19. The method according to claim 1, wherein each of the plurality of print jobs are new print jobs.

20. A non-transitory computer readable medium (CRM) storing computer program code executed by a computer processor that performs a process for scheduling print jobs on a plurality of printers, the process comprising:
collecting job information on each of a plurality of print jobs;
obtaining a predicted success rate for each of the plurality of print jobs with each of the plurality of printers based on the job information on the each of the plurality of print jobs, the predicted success rate being a likelihood that a print job can be successfully completed by a printer, the obtained predicted success rate comprising inputting the job information on the each of the plurality of print jobs into a machine learning service; and
assigning each of the plurality of print jobs to one or more printers of the plurality of printers with the predicted success rate for each of the one or more printers of the plurality of print jobs being greater than a predicted success threshold.

21. A system for printing a job ticket received from a client computer, the system comprising:
one or more client devices configured to generate print jobs;
a plurality of printers configured to print the print jobs; and
a server having a memory and a processor, the processor configured to:
collect job information on each of the plurality of print jobs;
obtain a predicted success rate for each of the plurality of print jobs with each of the plurality of printers based on the job information on the each of the plurality of print jobs, the predicted success rate being a likelihood that a print job can be successfully completed by a printer; and
assign each of the plurality of print jobs to one or more printers of the plurality of printers with the predicted success rate for each of the one or more printers of the plurality of print jobs being greater than a predicted success threshold.

* * * * *